US011838961B2

United States Patent
Cheng et al.

(10) Patent No.: US 11,838,961 B2
(45) Date of Patent: Dec. 5, 2023

(54) SIDELINK GROUPCAST CONFIGURATION TO SUPPORT FEEDBACK CONTROL

(71) Applicant: QUALCOMM Incorporated, San Diego, CA (US)

(72) Inventors: Hong Cheng, Basking Ridge, NJ (US); Sudhir Kumar Baghel, Hillsborough, NJ (US); Kapil Gulati, Montgomery, NJ (US); Dan Vassilovski, Del Mar, CA (US); Gabi Sarkis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/031,768

(22) Filed: Sep. 24, 2020

(65) Prior Publication Data
US 2021/0105842 A1 Apr. 8, 2021

Related U.S. Application Data

(60) Provisional application No. 62/909,718, filed on Oct. 2, 2019.

(51) Int. Cl.
*H04W 76/14* (2018.01)
*H04W 28/24* (2009.01)
(Continued)

(52) U.S. Cl.
CPC ........... *H04W 76/14* (2018.02); *H04L 1/1861* (2013.01); *H04L 5/0055* (2013.01); *H04W 4/08* (2013.01); *H04W 28/24* (2013.01); *H04W 76/27* (2018.02)

(58) Field of Classification Search
CPC ....... H04W 76/10; H04W 76/14; H04W 4/06; H04W 4/08; H04W 76/20; H04W 76/27;
(Continued)

(56) References Cited

U.S. PATENT DOCUMENTS

2019/0052436 A1* 2/2019 Desai .................... H04L 1/1671
2020/0092685 A1* 3/2020 Fehrenbach ......... H04B 7/2606
(Continued)

FOREIGN PATENT DOCUMENTS

FI WO2021/023380 * 2/2021 ............ H04W 24/10

OTHER PUBLICATIONS

Huawei, et al., "HARQ Related Identifier Assignment for Option2 Groupcast Mechanism", 3GPP Draft, 3GPP TSG-RAN WG2 Meeting #107, R2-1911068 HARQ Related Identifier Assignment for Option2 Groupcast Mechanism, 3rd Generation Partnership Project (3GPP), Mobile Competence Centre, 650, Route Des Lucioles, F-06921 SOPHI, vol. RAN WG2, No. Prague, Czech Republic, Aug. 26, 2019-Aug. 30, 2019, Aug. 16, 2019 (Aug. 16, 2019), XP051768830, 5 Pages, Retrieved from the Internet: URL: http://www.3gpp.org/ftp/tsg_ran/WG2_RL2/TSGR2_107/Docs/R2-1911068.zip, [retrieved on Aug. 16, 2019], Section 2.
(Continued)

*Primary Examiner* — Warner Wong
(74) *Attorney, Agent, or Firm* — Holland & Hart LLP/QUALCOMM Incorporated

(57) ABSTRACT

Methods, systems, and devices for wireless communications are described, in which a user equipment (UE) may communicate with one or more other UEs using sidelink communications. Multiple UEs may form a sidelink communications group and provide for sidelink groupcast communications in which an identification of a UE is determined based at least in part on a member identification of the UE within the group. Each UE in the group may determine feedback resources for acknowledgment feedback within the group based on a UE identification and a size of the group.

59 Claims, 14 Drawing Sheets

(51) Int. Cl.
  *H04L 5/00* (2006.01)
  *H04L 1/1829* (2023.01)
  *H04W 76/27* (2018.01)
  *H04W 4/08* (2009.01)

(58) Field of Classification Search
  CPC ............. H04W 1/1829; H04W 1/1861; H04W 5/0045; H04W 5/0055; H04W 76/40; H04W 28/10; H04W 28/24; H04W 28/0875; H04L 29/2292; H04L 29/06326; H04L 29/08306
  See application file for complete search history.

(56) References Cited

U.S. PATENT DOCUMENTS

| | | | |
|---|---|---|---|
| 2020/0260231 A1* | 8/2020 | Ganesan | H04L 1/1671 |
| 2020/0314959 A1* | 10/2020 | Agiwal | H04W 4/44 |
| 2020/0344637 A1 | 10/2020 | Kim et al. | |
| 2020/0386081 A1* | 12/2020 | Chen | C09K 8/516 |
| 2020/0396636 A1* | 12/2020 | Cheng | H04L 47/14 |
| 2021/0050954 A1* | 2/2021 | Ryu | H04W 72/02 |
| 2021/0345072 A1* | 11/2021 | Selvanesan | H04W 4/70 |
| 2022/0085922 A1* | 3/2022 | Lu | H04W 28/04 |
| 2022/0103298 A1* | 3/2022 | Lee | H04W 72/14 |
| 2022/0190971 A1* | 6/2022 | Zhang | H04W 4/70 |
| 2022/0417821 A1* | 12/2022 | Xu | H04W 36/0011 |
| 2023/0048146 A1* | 2/2023 | Zhao | H04W 8/005 |

OTHER PUBLICATIONS

Huawei, et al., "Identifier Assignment to Enable Option2 Groupcast HARQ Feedback", 3GPP Draft, 3GPP TSG-RAN WG2 Meeting #107 bis, R2-1913705 Identifier Assignment to Enable Option2 Groupcast HARQ, 3rd Generation Partnership Project (3GPP), Mobile Competence Centre, 650, Route Des Lucioles, F-06921 Sophia-Antipolis, vol. RAN WG2, No. Chongqing, China, Oct. 14, 2019-Oct. 18, 2019, Oct. 4, 2019 (Oct. 4, 2019), XP051805170, 5 Pages, Retrieved from the Internet: URL: https://ftp.3gpp.org/tsg_ran/WG2_RL2/TSGR2_107bis/Docs/R2-1913705.zip R2-1913705 Identifier assignment to enable Option2 groupcast HARQ.doc, [retrieved on Oct. 4, 2019], the whole document.
Huawei, et al., "Sidelink Physical Layer Procedures for NR V2X", 3GPP Draft, 3GPP TSG RAN WG1 Meeting #98, R1-1908040, 3rd Generation Partnership Project (3GPP), Mobile Competence Centre, 650, Route Des Lucioles, F-06921 Sophia-Antipolis Cedex, France, vol. RAN WG1, No. Prague, Czech Republic, Aug. 26, 2019-Aug. 30, 2019, Aug. 17, 2019 (Aug. 17, 2019), XP051764663, 25 Pages, Retrieved from the Internet: URL: http://www.3gpp.org/ftp/tsg_ran/WG1_RL1/TSGR1_98/Docs/R1-1908040.zip, [retrieved on Aug. 17, 2019], p. 3/25.
International Search Report and Written Opinion—PCT/US2020/052664—ISAEPO—dated Dec. 15, 2020.
Lenovo, et al., "HARQ Feedback Impact on RAN2", 3GPP Draft, 3GPP TSG RAN WG2 #107, R2-1910411 HARQ Feedback Impact on RAN2, 3rd Generation Partnership Project (3GPP), Mobile Competence Centre, 650, Route Des Lucioles, F-06921 Sophia-Antipolis Cedex, France, vol. RAN WG2, No. Prague, Czech Republic, Aug. 26, 2019-Aug. 30, 2019, Aug. 15, 2019 (Aug. 15, 2019), XP051768190, 4 pages, Retrieved from the Internet: URL: http://www.3gpp.org/ftp/tsg_ran/WG2_RL2/TSGR2_107/Docs/R2-1910411.zip, [retrieved on Aug. 15, 2019], Section 2.1.
ZTE: Discussion on Groupcast Feedback for NR V2X, 3GPP Draft, 3GPP TSG-RAN WG2 Meeting #107, R2-1909078 Discussion on Groupcast Feedback for NR V2X, 3rd Generation Partnership Project (3GPP), Mobile Competence Centre, 650, Route Des Lucioles, F-06921 Sophia-Antipolis Cedex, FRA, vol. RAN WG2, No. Prague, Czech Republic, Aug. 26, 2019-Aug. 30, 2019, Aug. 16, 2019 (Aug. 16, 2019), XP051766888, 6 Pages, Retrieved from the Internet: URL: http://www.3gpp.org/ftp/tsg_ran/WG2_RL2/TSGR2_107/Docs/R2-1909078.zip, [retrieved on Aug. 16, 2019], Section 2.2.1.
3GPP TS 23.287: "3rd Generation Partnership Project; Technical Specification Group Services and System Aspects; Architecture Enhancements for 5G System (5GS) to Support Vehicle-to-Everything (V2X) Services (Release 16)", V1.1.0 (Jul. 2019), Valbonne, France, 50 Pages.
Lee S., "Reply LS on Sidelink HARQ Feedback for Groupcast", 3GPP TSG RAN WG1 #98, R1-1909879, Prague, CZ, Aug. 26-30, 2019, 2 pages.

* cited by examiner

SIDELINK GROUPCAST CONFIGURATION TO SUPPORT FEEDBACK CONTROL

CROSS REFERENCE

The present Application for Patent claims the benefit of U.S. Provisional Patent Application No. 62/909,718 by CHENG et al., entitled "SIDELINK GROUPCAST CONFIGURATION TO SUPPORT FEEDBACK CONTROL," filed Oct. 2, 2019, assigned to the assignee hereof, and expressly incorporated by reference herein.

INTRODUCTION

The following relates generally to wireless communications, and more specifically to sidelink groupcast configuration.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

SUMMARY

A method of wireless communication at a first UE is described. The method may include receiving, from a second UE, sidelink groupcast information of a first sidelink group including, a group size of the first sidelink group, and a member identification of the first UE within the first sidelink group, where the first sidelink group includes a plurality of members including at least the first UE and the second UE. The method may also include determining, at the first UE, an identification for communication with the first sidelink group based on the sidelink groupcast information and communicating with the first sidelink group based on the determined identification.

An apparatus for wireless communication at a first UE is described. The apparatus may include a processor and memory coupled to the processor. The processor and the memory may be configured to cause the apparatus to receive, from a second UE, sidelink groupcast information of a first sidelink group including, a group size of the first sidelink group, and a member identification of the first UE within the first sidelink group, where the first sidelink group includes a plurality of members including at least the first UE and the second UE. The processor and memory may also be configured to cause the apparatus to determine, at the first UE, an identification for communication with the first sidelink group based on the sidelink groupcast information and communicate with the first sidelink group based on the determined identification.

Another apparatus for wireless communication at a first UE is described. The apparatus may include means for receiving, from a second UE, sidelink groupcast information of a first sidelink group including, a group size of the first sidelink group, and a member identification of the first UE within the first sidelink group, where the first sidelink group includes a plurality of members including at least the first UE and the second UE. The apparatus may also include means for determining, at the first UE, an identification for communication with the first sidelink group based on the sidelink groupcast information and communicating with the first sidelink group based on the determined identification.

A non-transitory computer-readable medium storing code for wireless communication at a first UE is described. The code may include instructions executable by a processor to receive, from a second UE, sidelink groupcast information of a first sidelink group including, a group size of the first sidelink group, and a member identification of the first UE within the first sidelink group, where the first sidelink group includes a plurality of members including at least the first UE and the second UE. The code may also include instructions executable by a processor to determine, at the first UE, an identification for communication with the first sidelink group based on the sidelink groupcast information and communicate with the first sidelink group based on the determined identification.

In some examples of the method, apparatuses, and non-transitory computer-readable medium described herein, the identification is a source layer-2 identification, and the member identification of the first UE is included as a first subset of bits of the source layer-2 identification. In some examples of the method, apparatuses, and non-transitory computer-readable medium described herein, the sidelink groupcast information further includes a group identifier of a first sidelink group. In some examples of the method, apparatuses, and non-transitory computer-readable medium described herein, the group identifier is mapped into a second subset of bits of a destination layer-2 identification. Some examples of the method, apparatuses, and non-transitory computer-readable medium described herein may further include operations, features, means, or instructions for determining a layer-1 identification based on the source layer-2 identification, where the layer-1 identification is indicated in a physical layer control information transmission to the first sidelink group. In some examples of the method, apparatuses, and non-transitory computer-readable medium described herein, the layer-1 identification corresponds to a subset of the source layer-2 identification that indicates the group identifier of the first sidelink group and the member identification of the first UE within the first sidelink group. In some examples of the method, apparatuses, and non-transitory computer-readable medium described herein, a number of bits of the first subset of bits is determined based on the group size of the first sidelink group.

Some examples of the method, apparatuses, and non-transitory computer-readable medium described herein may further include operations, features, means, or instructions for determining, based on the group size of the first sidelink group, whether each of the plurality of members of the first sidelink group uses separate feedback resources for providing acknowledgment feedback information to other of the plurality of members of the first sidelink group. In some examples of the method, apparatuses, and non-transitory computer-readable medium described herein, the first UE determines whether separate feedback resources or common feedback resources are used for providing the acknowledgement feedback information based on whether a number of the plurality of members of the first sidelink group is above a threshold number of members. In some examples of the method, apparatuses, and non-transitory computer-readable medium described herein, the first UE determines whether separate feedback resources or common feedback resources are used for providing the acknowledgement feedback information based on a pre-configuration of the first UE, control signaling received from another UE or a base station, or any combinations thereof. In some examples of the method, apparatuses, and non-transitory computer-readable medium described herein, the first UE determines whether separate feedback resources or common feedback resources are used for providing the acknowledgement feedback information based on radio resources control (RRC) signaling received at the first UE, a system information block (SIB) received at the first UE, a medium access control (MAC) control element received at the first UE, or any combinations thereof.

Some examples of the method, apparatuses, and non-transitory computer-readable medium described herein may further include operations, features, means, or instructions for determining, based at least in part on the group size of the first sidelink group and the member identification of the first UE within the first sidelink group, a set of feedback resources for transmitting acknowledgment feedback information to one or more members of the first sidelink group. Some examples of the method, apparatuses, and non-transitory computer-readable medium described herein may further include operations, features, means, or instructions for receiving a first groupcast communication from the second UE, determining acknowledgment feedback for the first groupcast communication, and transmitting the acknowledgment feedback for the first groupcast communication to the second UE using the set of feedback resources.

Some examples of the method, apparatuses, and non-transitory computer-readable medium described herein may further include operations, features, means, or instructions for transmitting a groupcast communication to other of the plurality of members of the first sidelink group, monitoring for acknowledgment feedback from the other of the plurality of members of the first sidelink group, and determining to retransmit the groupcast communication based on the acknowledgment feedback from at least one of the plurality of members of the first sidelink group. In some examples of the method, apparatuses, and non-transitory computer-readable medium described herein, the determining to retransmit further may include operations, features, means, or instructions for determining that at least one of the plurality of members of the first sidelink group provides a negative acknowledgment, determining that an acknowledgment feedback from at least one of the plurality of members of the first sidelink group is not received at the first UE, or any combinations thereof.

Some examples of the method, apparatuses, and non-transitory computer-readable medium described herein may further include operations, features, means, or instructions for configuring an access stratum layer at the first UE for a quality of service (QoS) flow for groupcast communications associated with a layer-2 identification, and where the access stratum layer determines a QoS flow identification and a QoS context, and derives a layer-1 identification for the QoS flow. In some examples of the method, apparatuses, and non-transitory computer-readable medium described herein, the sidelink groupcast information is received at an application layer of the first UE or at a group management mid-ware layer at the first UE.

A method of wireless communication at a first UE is described. The method may include configuring a first sidelink group for sidelink groupcast communication, where the first sidelink group includes a plurality of members including at least the first UE and a second UE, determining a member identification of the first UE, determining, based on a group size of the first sidelink group and the determined member identification of the first UE, a feedback resource configuration for the sidelink group, and transmitting, to other of the plurality of members of the first sidelink group, sidelink groupcast information that indicates at least the feedback resource configuration. The method may also include determining, at the first UE, an identification for communication with the first sidelink group based on the sidelink groupcast information and communicating with the first sidelink group based on the determined identification and the feedback resource configuration.

An apparatus for wireless communication at a first UE is described. The apparatus may include a processor and memory coupled to the processor. The processor and the memory may be configured to cause the apparatus to cause the apparatus to configure a first sidelink group for sidelink groupcast communication, where the first sidelink group includes a plurality of members including at least the first UE and a second UE, determine a member identification of the first UE, determine, based on a group size of the first sidelink group and the determined member identification of the first UE, a feedback resource configuration for the sidelink group, where the feedback resource configuration includes a common feedback resource use by the plurality of members or separate feedback resources corresponding to each of the plurality of members, and transmit, to other of the plurality of members of the first sidelink group, sidelink groupcast information that indicates at least the feedback resource configuration. The processor and memory may also be configured to cause the apparatus to determine, at the first UE, an identification for communication with the first sidelink group based on the sidelink groupcast information and communicate with the first sidelink group based on the determined identification and the feedback resource configuration.

Another apparatus for wireless communication at a first UE is described. The apparatus may include means for configuring a first sidelink group for sidelink groupcast communication, where the first sidelink group includes a plurality of members including at least the first UE and a second UE, determining a member identification of the first UE, determining, based on a group size of the first sidelink group and the determined member identification of the first UE, a feedback resource configuration for the sidelink group, and transmitting, to other of the plurality of members of the first sidelink group, sidelink groupcast information that indicates at least the feedback resource configuration. The apparatus may also include means for determining, at the first UE, an identification for communication with the first sidelink group based on the sidelink groupcast information and communicating with the first sidelink group based on the determined identification and the feedback resource configuration.

A non-transitory computer-readable medium storing code for wireless communication at a first UE is described. The code may include instructions executable by a processor to configure a first sidelink group for sidelink groupcast communication, where the first sidelink group includes a plurality of members including at least the first UE and a second UE, determine a member identification of the first UE, determine, based on a group size of the first sidelink group and the determined member identification of the first UE, a feedback resource configuration for the sidelink group, and transmit, to other of the plurality of members of the first sidelink group, sidelink groupcast information that indicates at least the feedback resource configuration. The code may also include instructions executable by a processor to determine, at the first UE, an identification for communication with the first sidelink group based on the sidelink groupcast information and communicate with the first sidelink group based on the determined identification and the feedback resource configuration.

In some examples of the method, apparatuses, and non-transitory computer-readable medium described herein, the feedback resource configuration includes a common feedback resource use by the plurality of members or separate feedback resources corresponding to each of the plurality of members. In some examples if the method, apparatuses, and non-transitory computer-readable medium described herein, the separate feedback resources are used for providing acknowledgement feedback information when a number of the plurality of members of the first sidelink group is at or below a threshold number of members, and the common resources are used for providing acknowledgement feedback information when the number of the plurality of members of the first sidelink group exceeds the threshold number of members. Some examples of the method, apparatuses, and non-transitory computer-readable medium described herein may further include operations, features, means, or instructions for transmitting a groupcast communication to other of the plurality of members of the first sidelink group, monitoring, based on the feedback resource configuration, for acknowledgment feedback from the other of the plurality of members of the first sidelink group, and determining to retransmit the groupcast communication based on acknowledgment feedback from at least one of the plurality of members of the first sidelink group. In some examples of the method, apparatuses, and non-transitory computer-readable medium described herein, the determining to retransmit further may include operations, features, means, or instructions for determining that at least one of the plurality of members of the first sidelink group provides a negative acknowledgment, determining that an acknowledgment feedback from at least one of the plurality of members of the first sidelink group is not received at the first UE, or any combinations thereof.

In some examples of the method, apparatuses, and non-transitory computer-readable medium described herein, the first UE determines whether the separate feedback resources or the common feedback resources are used for providing the acknowledgement feedback information based on a pre-configuration of the first UE, control signaling received from another UE or a base station, or any combination thereof. In some examples of the method, apparatuses, and non-transitory computer-readable medium described herein, the first UE determines whether separate feedback resources or common feedback resources are used for providing the acknowledgement feedback information based on RRC signaling received at the first UE, a SIB received at the first UE, a MAC control element received at the first UE, or any combination thereof. In some examples of the method, apparatuses, and non-transitory computer-readable medium described herein, a number of the separate feedback resources corresponds to a number of the plurality of members of the first sidelink group minus one.

In some examples of the method, apparatuses, and non-transitory computer-readable medium described herein, the sidelink groupcast information further indicates a group identifier of the first sidelink group, a group size of the first sidelink group, and a corresponding member identification within the first sidelink group of each of the plurality of members. In some examples of the method, apparatuses, and non-transitory computer-readable medium described herein, the identification is a source layer-2 identification, and the identification of the first UE is included as a first subset of bits of the source layer-2 identification, and where the group identifier is mapped into a second subset of bits of a destination layer-2 identification. Some examples of the method, apparatuses, and non-transitory computer-readable medium described herein may further include operations, features, means, or instructions for determining a layer-1 identification based on the source layer-2 identification, where the layer-1 identification is indicated in a physical layer control information transmission to the first sidelink group. In some examples of the method, apparatuses, and non-transitory computer-readable medium described herein, the layer-1 identification corresponds to a subset of the source layer-2 identification. In some examples of the method, apparatuses, and non-transitory computer-readable medium described herein, a number of bits of the first subset of bits is determined based on the group size of the first sidelink group.

DETAILED DESCRIPTION

Figure 1:
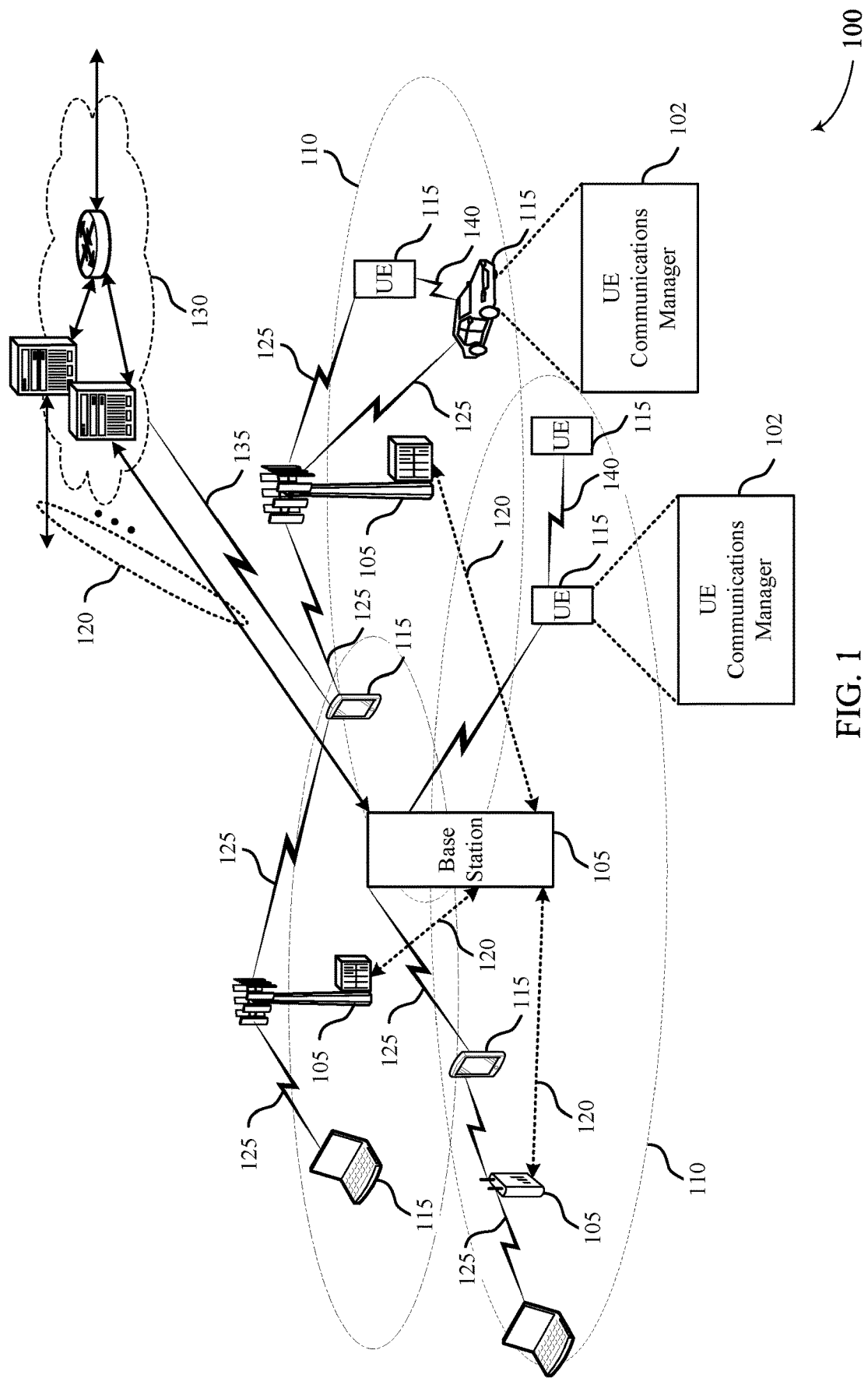
FIG. 1 illustrates an example of a system for wireless communications that supports sidelink groupcast configuration to support feedback control in accordance with aspects of the present disclosure.

A wireless communications system may support both access links and sidelinks for communications between wireless devices. An access link may refer to a communication link between a UE and a base station. For example, an access link may support uplink signaling, downlink signaling, connection procedures, etc. A sidelink may refer to any communication link between similar wireless devices (e.g., a communication link between UEs, or a backhaul communication link between base stations). It is noted that while various examples provided herein are discussed for UE sidelink devices, such sidelink techniques may be used for any type of wireless devices that use sidelink communications. For example, a sidelink may support device-to-device (D2D) communications, vehicle-to-everything (V2X) or vehicle-to-vehicle (V2V) communications, message relaying, discovery signaling, beacon signaling, or any combination of these or other signals transmitted over-the-air from one UE to one or more other UEs.

As demand for sidelink communication increases (e.g., due to increased V2X demand for autonomous and semi-autonomous vehicles, D2D communication between Internet-of-Things (IoT) devices, etc.), techniques to efficiently and reliably enhance throughput and reliability of sidelink channels is desirable. Techniques such as discussed in various aspects of the present disclosure provide for sidelink groupcast communications in which an identification of a UE is determined based at least in part on a member identification of the UE within the group. Techniques such as discussed in one or more aspects of the present disclosure may also provide for sidelink groupcast communications in which feedback resources for acknowledgment feedback are based on a UE identification and a size of the group.

In some cases, a UE may determine whether a common feedback resource set is to be shared among multiple UEs of the group, or whether separate feedback resources are configured for each UE, based at least in part on the size of the group. In some cases, when separate feedback resources are configured for each UE in a group of sidelink groupcast UEs, the specific feedback resources for a UE may be determined based on a UE position within the group of UEs (i.e., a UE identification relative to identifications associated with other UEs in the group) and a size of the group. For example, a first UE (e.g., based on a lowest value of a UE identifier of each of the member UEs of the group) may determine that a first set of feedback resources are to be used for providing acknowledgment feedback to a second UE of the group. In such a case, a third UE (e.g., having a higher value UE identifier than the second UE) may provide acknowledgment feedback using a second set of feedback resources that are determined based on the third UE identification minus one, due to the second UE not needing acknowledgement feedback resources (i.e., due to the second UE being the transmitting UE that receives the acknowledgment feedback from other UEs of the group).

In some cases, a higher layer, such as an application layer at each UE or a mid-ware layer at each UE, may provide a UE member ID (e.g., based on communications from a group leader of the group of UEs) to a lower layer (e.g., layer-2) at the UE. In some implementations, the lower layer may include one or more of a service data adaptation protocol (SDAP) layer, a packet data convergence protocol (PDCP) layer, a radio link control (RLC) layer, or a medium access control (MAC) at each UE. The may then determine a identification based on the UE member ID, a group identification, a group size, or any combinations thereof. In some cases, a UE may map its UE member ID to a first subset of bits of a source layer-2 ID and the group ID to a second subset of bits in a destination layer-2 ID.

Techniques such as discussed herein thus provide for enhanced reliability and efficiency in determining UE identifications and feedback resources in sidelink groupcast communications. For example, by enabling the determination of a UE identification and feedback resources based on a group size, or UE identification, or both, efficient determination of feedback resources may be provided without additional signaling and associated added overhead. Further, by determining source layer-2 IDs and destination layer-2 IDs based on the UE member ID and group ID, respectively, a layer-2 ID may be determined at each UE, which further reduces signaling and overhead associated with sidelink groupcast configuration. Additionally, in some cases, determination of whether common feedback resources or separate feedback resources are used by a group of UEs may be determined at each UE based on the group size, which may also allow for reduced signaling overhead.

Aspects of the disclosure are initially described in the context of a wireless communications system. Aspects of the disclosure are further illustrated by and described with reference to apparatus diagrams, system diagrams, and flowcharts that relate to sidelink groupcast configuration to support feedback control.

FIG. 1 illustrates an example of a wireless communications system 100 that supports sidelink groupcast configuration to support feedback control in accordance with one or more aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may be dispersed throughout a geographic area to form the wireless communications system 100 and may be devices in different forms or having different capabilities. Base stations 105 and UEs 115 may wirelessly communicate via one or more communication links 125. Each base station 105 may provide a coverage area 110 over which UEs 115 and the base station 105 may establish communication links 125. The coverage area 110 may be an example of a geographic area over which a base station 105 and a UE 115 support the communication of signals according to one or more radio access technologies.

UEs 115 may be dispersed throughout a coverage area 110 of the wireless communications system 100, and each UE 115 may be stationary, or mobile, or both at different times. UEs 115 may be devices in different forms or having different capabilities. Some example UEs 115 are illustrated in FIG. 1. The UEs 115 described herein may be able to communicate with various types of devices, such as other UEs 115, base stations 105, or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with the core network 130 through backhaul links 120 (e.g., via an S1, N2, N3, or other interface). Base stations 105 may communicate with one another over backhaul links 120 (e.g., via an X2, Xn, or other interface) either directly (e.g., directly between base stations 105), or indirectly (e.g., via core network 130), or both. In some examples, backhaul links 120 may be or include one or more wireless links. One or more of base stations 105 described herein may include or may be referred to by a person of ordinary skill in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or other suitable terminology. In some examples, a UE 115 may communicate with the core network 130 through communication link 135.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, a machine type communications (MTC) device, or the like, which may be implemented in various objects such as appliances, vehicles, meters, or the like.

The UEs 115 described herein may be able to communicate with various types of devices, such as other UEs 115 that may sometimes act as relays as well as base stations 105 and network equipment including macro eNBs or gNBs, small cell eNBs or gNBs, relay base stations, and the like, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting communication links 125. For example, a carrier used for a communication link 125 may include a portion of a radio frequency spectrum band (e.g., a bandwidth part (BWP)) that is operated according to physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a non-standalone mode where a connection is anchored using a different carrier (e.g., of the same or a different radio access technology).

Communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 megahertz (MHz)). Devices of the wireless communications system 100 (e.g., base stations 105, UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

The electromagnetic spectrum is often subdivided, based on frequency/wavelength, into various classes, bands, channels, etc. In 5G NR two initial operating bands have been identified as frequency range designations FR1 (410 MHz–7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into BWPs having the same or different numerologies. In some examples, a UE 115 may be configured with multiple BWPs. In some cases, a single BWP for a carrier is active at a given time, and communications for the UE 115 may be restricted to active BWPs.

Time intervals for base stations 105 or UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some cases, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some cases, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or various combinations thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, exterior spaces between or overlapping with geographic coverage areas 110, or the like.

A macro cell may cover a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to UEs 115 with service subscriptions with the network provider or may provide restricted access to UEs 115 having an association with the small cell (e.g., UEs 115 in a closed subscriber group (CSG), UEs 115 associated with users in a home or office, and the like). A base station 105 may support one or multiple cells and may also support communications over the one or more cells using one or multiple component carriers. In some examples, a carrier may support multiple cells, and different cells may be configured according to different protocol types (e.g., MTC, narrowband IoT (NB-IoT), enhanced mobile broadband (eMBB), or others) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, overlapping geographic coverage areas 110 associated with different technologies may be supported by different base stations 105. The wireless communications system 100 may include, for example, a heterogeneous network in which different types of base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a predefined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some cases, a UE 115 may also be able to communicate directly with other UEs 115 over a device-to-device (D2D) communication link (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between UEs 115 without the involvement of a base station 105.

In some systems, the D2D communication link (e.g., a sidelink communication link 140) may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some cases, vehicles in a V2X system may communicate with roadside infrastructure, such as roadside units, or with the network via one or more network nodes (e.g., base stations 105) using vehicle-to-network (V2N) communications, or with both. Further, in some cases, groupcast communications among a group of UEs 115 may be performed via sidelink communication links 140, and configuration of identifications and feedback resources in sidelink groupcast communications may be performed according to various aspects discussed herein.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), a user plane function (UPF)). The control plane entity may manage non-access stratum (NAS) functions such as mobility, authentication, and bearer management for UEs 115 served by base stations 105 associated with the core network 130. User IP packets may be transferred through the user plane entity, which may provide IP address allocation as well as other functions. The user plane entity may be connected to the network operators IP services. The operators IP services may include access to the Internet, Intranet(s), an IP Multimedia Subsystem (IMS), or a Packet-Switched Streaming Service.

Some of the network devices, such as a base station 105, may include subcomponents such as an access network entity, which may be an example of an access node controller (ANC). Each access network entity may communicate with UEs 115 through a number of other access network transmission entities, which may be referred to as radio heads, smart radio heads, or transmission/reception points (TRPs). Each access network transmission entity may include one or more antenna panels. In some configurations, various functions of each access network entity or base station 105 may be distributed across various network devices (e.g., radio heads and ANCs) or consolidated into a single network device (e.g., a base station 105).

The wireless communications system 100 may operate using one or more frequency bands, such as frequency bands in the range of 300 megahertz (MHz) to 300 gigahertz (GHz). The region from 300 MHz to 3 GHz may be known as the ultra-high frequency (UHF) region or decimeter band, since the wavelengths range from approximately one decimeter to one meter in length. UHF waves may be blocked or redirected by buildings and environmental features, but the waves may penetrate structures sufficiently for a macro cell to provide service to UEs 115 located indoors. Transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between UEs 115 and base stations 105, and EHF antennas of the respective devices may be smaller and more closely spaced than UHF antennas. In some cases, this may facilitate use of antenna arrays within a device. The propagation of EHF transmissions, however, may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some cases, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, D2D transmissions, or the like.

A base station 105 or UE 115 may be equipped with multiple antennas, which may be used to employ techniques such as transmit diversity, receive diversity, multiple-input multiple-output (MIMO) communications, or beamforming. The antennas of a base station 105 or UE 115 may be located within one or more antenna arrays or antenna panels, which may support MIMO operations or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

UEs 115 and base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some cases, a device may support same-slot HARQ feedback, where the device may provide HARQ feedback in a specific slot for data received in a previous symbol in the slot. In other cases, the device may provide HARQ feedback in a subsequent slot, or according to some other time interval.

One or more of the base stations 105 may include a base station communications manager, which may configure one or more sidelink parameters for sidelink communication between a first UE 115 and a second UE 115 over a sidelink communication link 140 and transmit, to one or more of the sidelink UEs 115, a message indicating the one or more sidelink parameters.

UEs 115 may include a UE communications manager 102, which may determine sidelink communications parameters and configurations for sidelink communications. In some cases, the UE communications manager 102 may receive, from another sidelink UE 115, sidelink groupcast information of a sidelink group, which may include a group size and a UE member identification. Based on the sidelink groupcast information, the UE may determine an identification for communications with the sidelink group and communicate with the sidelink group based at least in part on the determined identification. In some cases, the UE communications manager 102 may determine, based at least in part on a group size of the sidelink group, a feedback resource configuration for the sidelink group, which may include a configuration in which acknowledgment feedback is provided by multiple UEs 115 using common feedback resources, or in which acknowledgment feedback is provided in separate feedback resources by individual UEs 115. In cases where separate feedback resources are configured, specific UE 115 resources within a set of different available resources may be determined based on a group size and a UE position within the group. The UE communications manager 102 may be an example of aspects of the UE communications manager 810 described herein.

Figure 2:
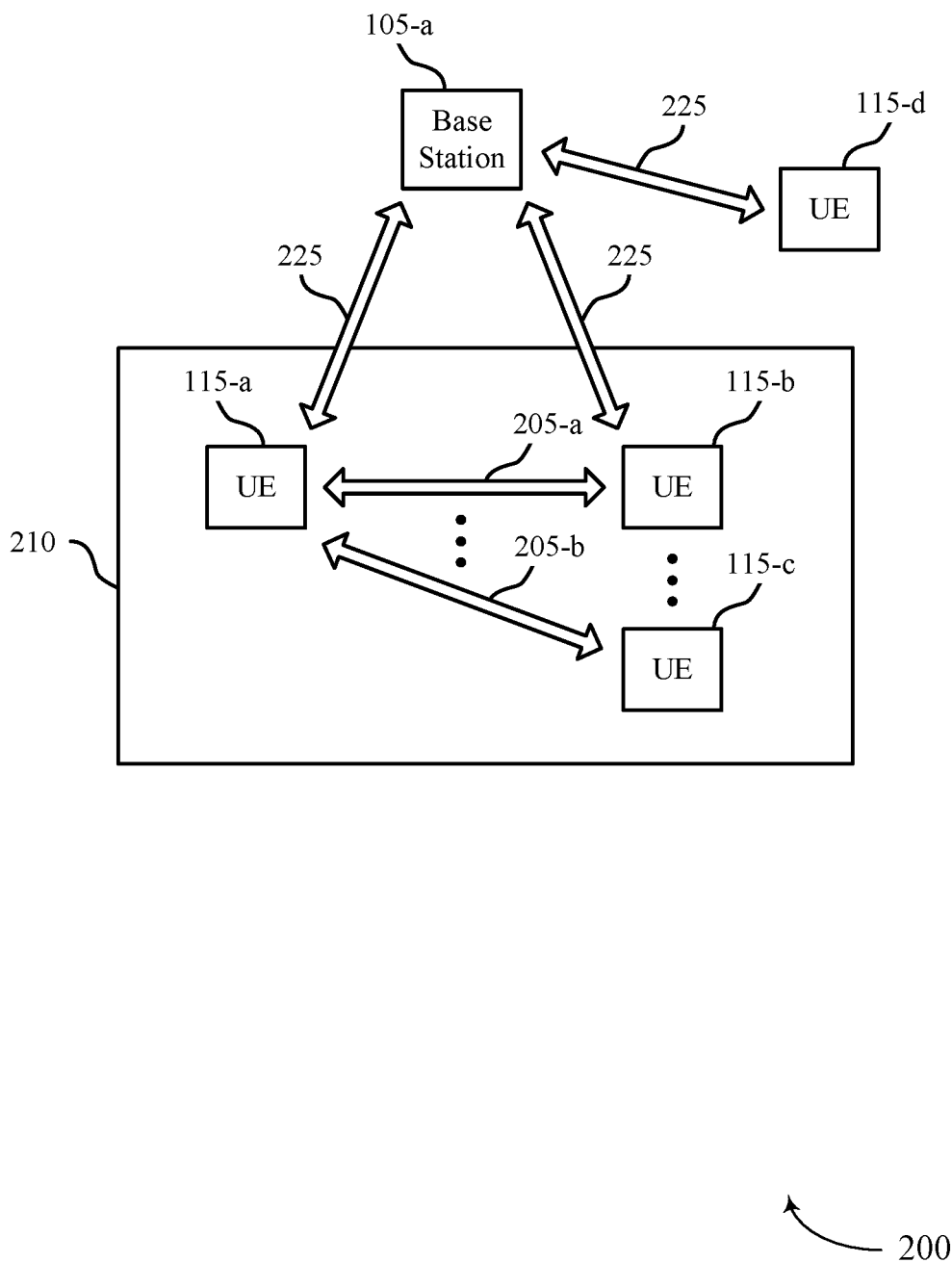
FIG. 2 illustrates an example of a wireless communications system that supports sidelink groupcast configuration to support feedback control in accordance with aspects of the present disclosure.

FIG. 2 illustrates an example of a wireless communications system 200 that supports sidelink groupcast configuration to support feedback control in accordance with one or more aspects of the present disclosure. In some examples, wireless communications system 200 may implement aspects of wireless communications system 100. In some examples, the wireless communications system 200 may include a first UE 115-*a*, a second UE 115-*b*, a third UE 115-*c*, a fourth UE 115-*d*, and base station 105-*a* which may be examples of UEs 115 and base stations 105 described with reference to FIG. 1. In some examples, the UE 115-*a*, the UE 115-*b*, and the UE 115-*c* may be members of a group 210 of UEs 115 and the UE 115-*d* may not be part of the group 210. One or more of the UEs 115 may communication with the base station 105 using a corresponding access link 225.

In this example, the first UE 115-*a*, second UE 115-*b*, and third UE 115-*c* may be members of a sidelink groupcast communications group, in which members of the group may communicate with other members of the group to provide data or other information via sidelinks 205. In some cases, an applications layer at the first UE 115-*a* may prompt the creation of the sidelink groupcast communications group, and the group may be established through communications with the applications layer of other UEs 115 in the group. It is noted that the illustrated sidelink groupcast communications group provide communications between three UEs 115, which are illustrated in wireless communications system 200 for the sake of brevity, and the techniques described below may be applicable to other numbers of UEs 115 within a system that may establish a groupcast communications group. Further, sidelink communication techniques may be used for device-to-device communication of wireless devices other than UEs, such as base station communications (e.g., wireless backhaul links between base stations or transmit-receive points (TRPs), etc.), communications between access points, and the like.

In some cases, upper layer applications that work to establish the sidelink groupcast communications group may provide group information to lower layers (e.g., to a UE access stratum (AS) which may include layer-2 and layer-1 layers, etc.). Such group information may be used to, for example, determine a HARQ feedback resource that is to be used by each UE 115 that receives communications in the group. In some cases, such HARQ feedback resources may be common acknowledgment resources that are shared among multiple UEs 115 (e.g., all UEs 115 that receive a groupcast transmission may share a same physical sidelink feedback channel (PSFCH) resource). In other cases, such HARQ resources may include separate acknowledgment feedback resources for different UEs 115 in the group (e.g., each UE 115 that receives a groupcast transmission may use a separate PSFCH resource to provide HARQ feedback). In some cases, separate lower layer signaling (e.g., layer-1 signaling of a physical or AS layer at UEs 115) may not be provided for groupcast communications, and thus in order for separate PSFCH resources to be implemented, each UE 115 in the group should be able to individually derive a distinct PSFCH to use. Thus, each group member UE's 115 AS layer may need an additional identifier from the upper layers to support independent selection of a PSFCH resource from a list that is not overlapping with a PSFCH resource of any other group member.

For HARQ operation, the AS layer may need an identifier that is both unique and able to indicate its position in the group. For example, in a group of five members, four PSFCH resources would be needed to provide feedback to a transmitting UE 115, and a receiving UE 115 would need to be able to determine which of the four PSFCH resources it is to use. In cases where the application layer (e.g., a V2X application layer) provides a group identification of the sidelink groupcast communications group, additional information would be needed to identify a unique ID for the UE 115. Thus, for HARQ operation (such as acknowledgement (ACK) based feedback), each group member UE's 115 AS layer would also need to be able to determine if all members had responded so that it can determine whether to perform retransmission. Further, given that each of the group member may act as a transmitter, all the UEs 115 in the group should be aware of the group size.

In some cases, such as platooning where a group of vehicles travel together in a convoy, an application layer protocol (e.g., a V2X application layer) may form the sidelink groupcast communications group, and negotiation may happen between UEs 115 that are members of the group. A group leader, such as a platoon leader in a platooning application, in some cases, will know the size of the group, and be able to assign each of the group members a UE member identifier. The group leader may then provide sidelink groupcast information of the sidelink group, which may include the group size and group member identifier of each UE 115 that is a member, which may then be provided to the AS layer at each UE 115. This information may be used to identify the PSFCH resources at each UE 115.

For example, in a group of five UEs 115, the group leader may inform one group member of the Group Identifier (e.g., group ID), group size (e.g., 5), and assign a member ID (e.g., UE member ID=3). With this information, a V2X layer at a UE 115 may map the group ID into a destination Layer-2 ID, which may be passed to the AS layer for operation. At the same time, when generating the source Layer-2 ID, the UE 115 may reflect the UE member ID in a subset of bits (e.g., in the last 3 bits) of the source Layer-2 ID. Additionally, the group size (e.g., 5) will be passed down to the AS layer. When the V2X layer configures the AS layer regarding a QoS flow for this V2X application, it would indicate that the QoS flow is for groupcast, and provide the corresponding QoS parameters (e.g., sidelink QoS identifier (PQI) and communications range for sidelink transmissions).

When the AS layer at a receiving UE 115 receives such information from the upper layers, it can operate accordingly. For example, if the UE 115 needs to perform a transmission, based on the QoS flow ID (PFI) and corresponding QoS context, the destination Layer-2 ID and source Layer-2 ID may be retrieved. In addition, the AS layer at the UE 115 may check the group size and determine whether separate PSFCH resources are to be used for each UE 115 to provide acknowledgment feedback. In some cases, a group size threshold value may be configured (e.g., as part of a sidelink groupcast configuration), in which group sizes at or below the threshold value (e.g., 19 group members) have separate PSFCH resources, and group sizes above the threshold value use common PSFCH resources. In cases where separate PSFCH resources are used for acknowledgment feedback, the AS layer at a UE 115 may derive the source Layer-1 ID from the source Layer-2 ID (e.g. take the last 8 bits of the Layer-2 ID), which reflects the member ID of the UE and include the source Layer-1 ID in sidelink control information (SCI).

Additionally, for a UE 115 in the group that is receiving a packet, such a receiving UE 115 can also be informed at the AS layer of the group size and UE member ID information associated with the group. Accordingly, when the packet is received, the UE 115 may use the group size and its own UE member ID to derive the PSFCH resources to use for providing acknowledgment feedback of the packet. For example, if the receiving UE 115 has a member ID=5 and the transmitting UE 115 has a member ID=3, the receiving UE 115 may use the group size to infer that the transmitting UE 115 member ID (member ID=3) (e.g. mod (Layer-1 ID, group size)), and determine that it should use the PSFCH resource indexed at four (i.e. receiving UE member ID−1, since the receiving UE member ID>transmitting UE member ID). Thus, the group size and UE member ID information provided by the application layer in such cases allows for separate feedback resources to be used at each member UE 115. In cases where the number of UEs 115 in the group is relatively large, and above the threshold value, common feedback resources may be used by multiple UEs of the group. In some cases, such operation may be inferred at each UE 115 by the group size that is provided in SCI. In other cases, the type of feedback operation may be explicitly indicated in the SCI when a transmission is performed.

Figure 3:
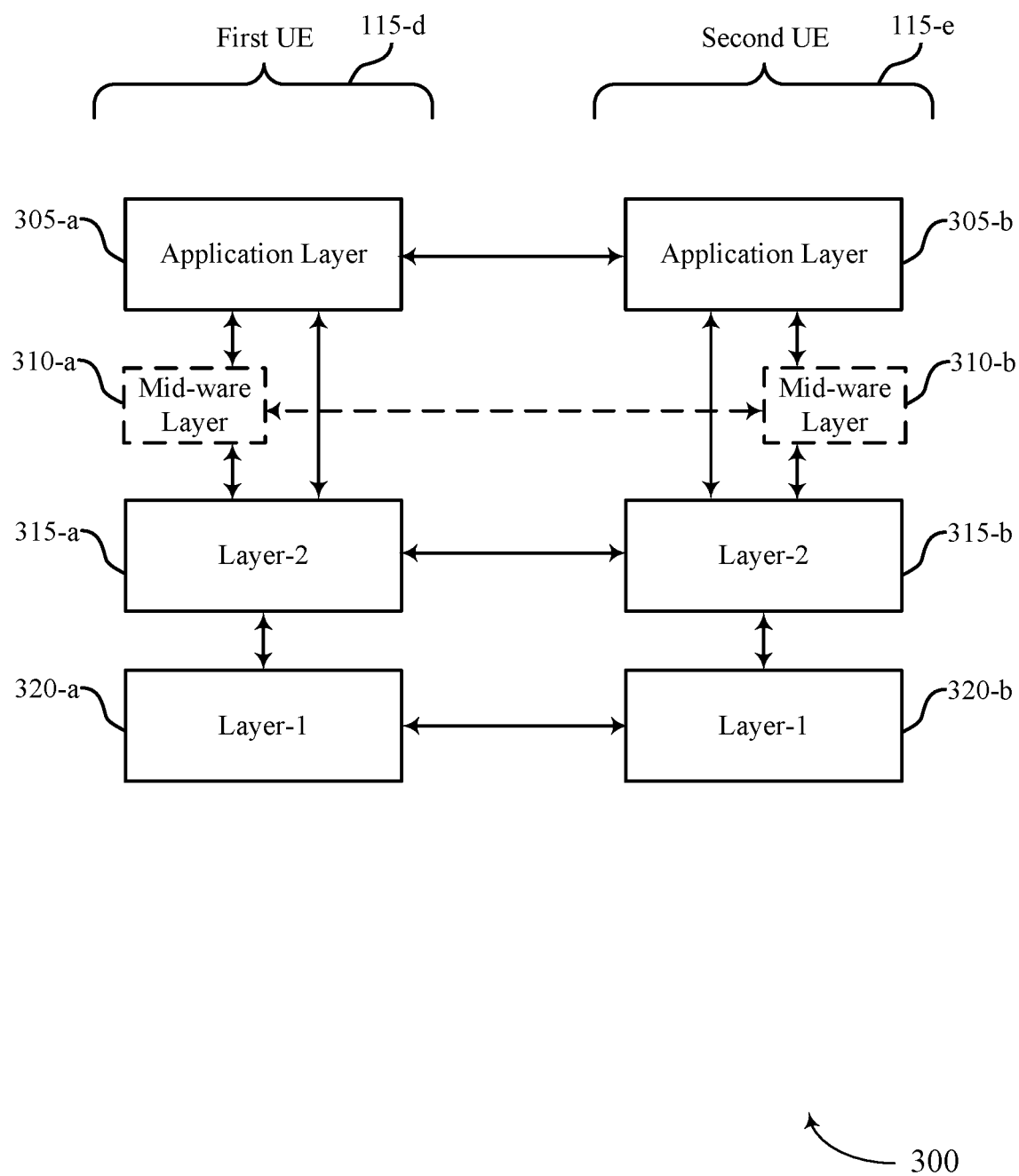
FIG. 3 illustrates an example of a UE protocol stack that supports sidelink groupcast configuration to support feedback control in accordance with aspects of the present disclosure.

FIG. 3 illustrates an example of a UE protocol stack 300 that supports sidelink groupcast configuration to support feedback control in accordance with one or more aspects of the present disclosure. In some examples, UE protocol stack 300 may implement aspects of wireless communications system 100 or 200. In this example, a first UE 115-d may communicate with a second UE 115-e in a sidelink groupcast group. Each of the first UE 115-d and the second UE 115-e include an application layer 305, an optional mid-ware layer 310, a layer-2 315, and a layer-1 320.

In some cases, layer-1 320 and layer-2 315 may be referred to as the AS layer. Layer-1 320 may include a physical layer that provides physical transport channels for over the air signals. Layer-2 315 may include, for example, a medium access control (MAC) layer, a radio link control (RLC) layer, a packet data convergence protocol (PDCP) layer, and a service data adaptation protocol (SDAP) layer. Optional mid-ware layer 310 may include, for example a group management mid-ware layer that may distribute sidelink groupcast information to the lower layers (e.g., layer-1 320 and layer-2 315). In other cases, the application layer 305 (e.g., a V2X application layer) may perform group management and distribute sidelink groupcast information to the lower layers. As discussed with reference to FIG. 2, in some cases source and destination layer-2 IDs, and a layer-1 ID may be determined by each UE 115 and used for groupcast communications and to determine resources for acknowledgment feedback transmission.

Figure 4:
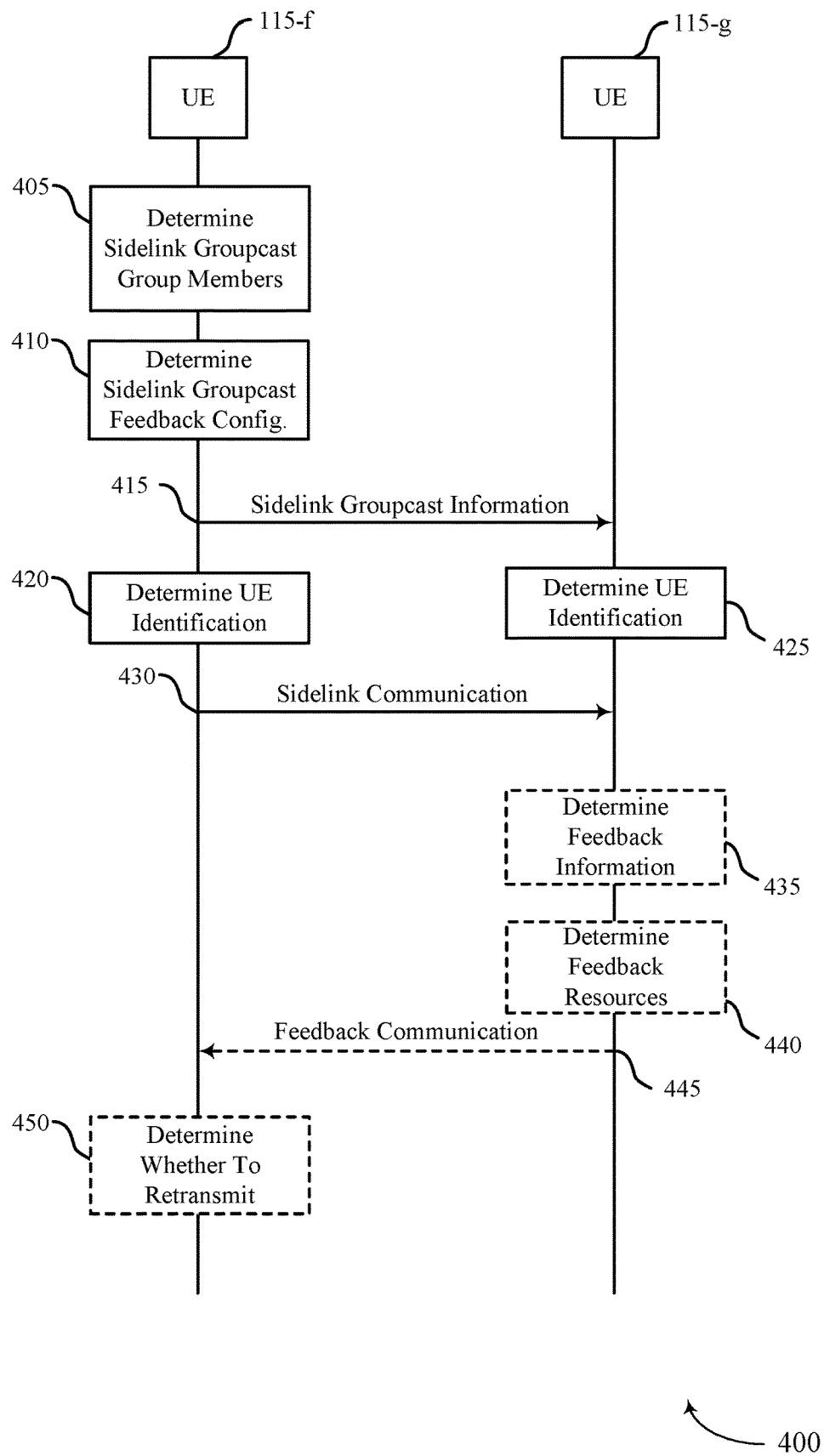
FIG. 4 illustrates an example of a process flow that supports sidelink groupcast configuration to support feedback control in accordance with aspects of the present disclosure.

FIG. 4 illustrates an example of a process flow 400 that supports sidelink groupcast configuration to support feedback control in accordance with one or more aspects of the present disclosure. In some examples, process flow 400 may implement aspects of wireless communications system 100 or 200. Process flow 400 may be implemented by first UE 115-*f*, second UE 115-*g*, or any other examples of UEs 115 or base stations 105 as described herein. Alternative examples of the following may be implemented, where some steps are performed in a different order than described or are not performed at all. In some cases, steps may include additional features not mentioned below, or further steps may be added.

At 405, the first UE 115-*f* may determine sidelink groupcast parameters. In some cases, the first UE 115-*f* may be a group leader for sidelink groupcast communications (e.g. a platoon leader in V2X sidelink communications), and may identify a number of other UEs, including the second UE 115-*g*, as group members. In some examples, the UE 115-*f* may determine a member ID of the UE 115-*f*. In some cases, the first UE 115-*f* may determine member IDs for each UE 115 in the group, as part of the determination of the sidelink groupcast parameters. Further, the first UE 115-*f* may determine a group ID associated with the sidelink groupcast communications group. In some cases, sidelink groupcast parameters may be determined by a group management mid-ware layer, at an application layer, or combination thereof.

At 410, the first UE 115-*f* may determine a sidelink groupcast feedback configuration. In some cases, the first UE 115-*f* may identify acknowledgment feedback resources for use in providing sidelink groupcast feedback. In some case, the acknowledgment feedback resources may include separate resources for different UEs 115 of the sidelink groupcast communications group. Such an acknowledgment feedback resource configuration may be determined as discussed with reference to FIG. 2, for example.

At 415, the first UE 115-*f* may transmit the sidelink groupcast information to the second UE 115-*g*, which may include a group ID, a member ID of the second UE 115-*g*, a group size, and an optional feedback configuration indication (e.g., indicating common or separate feedback resources). In some cases, the sidelink groupcast information may be provided in a SCI that is transmitted to the second UE 115-*g*.

At 420, the first UE 115-*f* may determine a UE identification that is to be provided to lower layers (e.g., an AS layer). Likewise, at 425, the second UE 115-*g* may determine a UE identification that is to be provided to lower layers (e.g., an AS layer). In some cases, the UE identification may include a source layer-2 ID, a destination layer-2 ID, a layer-1 ID, or any combinations thereof. Such UE identification(s) may be determined as discussed with reference to FIG. 2, for example.

At 430, the first UE 115-f may transmit a sidelink communication to at least the second UE 115-g, and one or more other UEs that may be included in the sidelink groupcast communications group. At 435, the second UE 115-g may receive and decode the sidelink communication, and generate acknowledgment feedback (e.g., a HARQ ACK/NACK indication).

At 440, the second UE 115-g may determine feedback resources that are to be used to transmit the acknowledgment feedback to the first UE 115-f. Such a determination of acknowledgment feedback resources may be performed as discussed with reference to FIG. 2, for example. At 445, the second UE 115-g may transmit a feedback communication with acknowledgment feedback to the first UE 115-f.

At 450, the first UE 115-f may determine whether to retransmit the sidelink communication based on received feedback. In some cases, the first UE 115-f may determine to retransmit the sidelink communication based on receiving one or more NACKs from other UEs 115 of the group. Additionally or alternatively, the first UE 115-f may determine to retransmit the sidelink communication based on receiving acknowledgment feedback from fewer than all of the UEs 115 in the group (e.g., based on the group size of the sidelink groupcast communications group).

Figure 5:
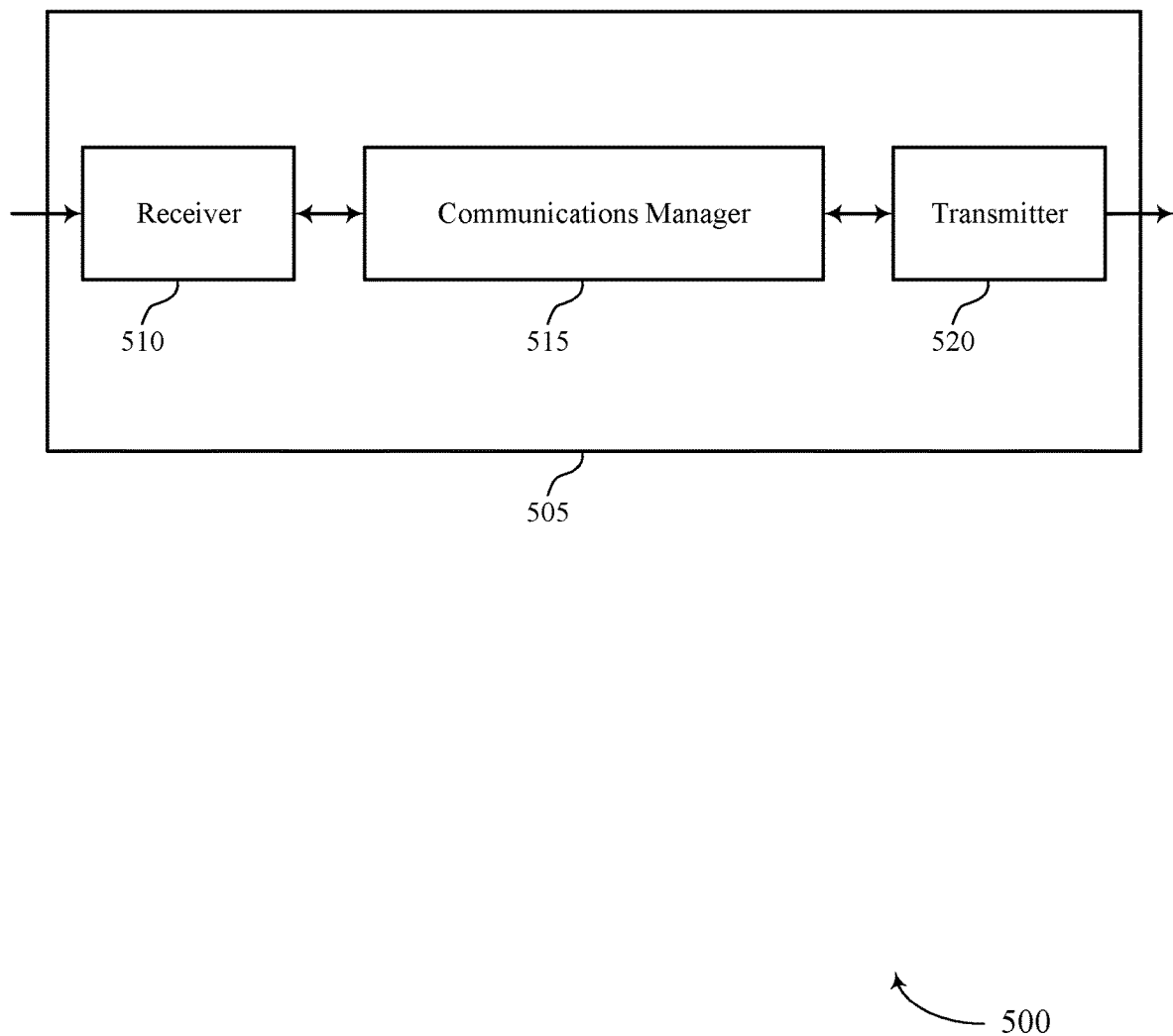
FIGS. 5 and 6 show block diagrams of devices that support sidelink groupcast configuration to support feedback control in accordance with aspects of the present disclosure.

FIG. 5 shows a block diagram 500 of a device 505 that supports sidelink groupcast configuration to support feedback control in accordance with one or more aspects of the present disclosure. The device 505 may be an example of aspects of a UE 115 (e.g., a first UE or a second UE) as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to sidelink groupcast configuration to support feedback control, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive, from a second UE, sidelink groupcast information of a first sidelink group including, a group size of the first sidelink group, and a member identification of the first UE within the first sidelink group, where the first sidelink group includes a plurality of members including at least the first UE and the second UE, determine, at the first UE, an identification for communication with the first sidelink group based on the sidelink groupcast information, and communicate with the first sidelink group based on the determined identification.

The communications manager 515 may also configure a first sidelink group for sidelink groupcast communication, where the first sidelink group includes a plurality of members including at least the first UE and a second UE, determine a member identification of the first UE, determine, based on a group size of the first sidelink group and the determined identification of the first UE, a feedback resource configuration for the sidelink group, where the feedback resource configuration includes a common feedback resource use by the plurality of members or separate feedback resources corresponding to each of the plurality of members, transmit, to other of the plurality of members of the first sidelink group, sidelink groupcast information that indicates at least the feedback resource configuration, communicate with the first sidelink group based on the determined identification and the feedback resource configuration, and determine, at the first UE, an identification for communication with the first sidelink group based on the sidelink groupcast information. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

The communications manager 515 may be an example of means for performing various aspects of sidelink groupcast configuration as described herein. The communications manager 515, or its sub-components, may be implemented in hardware (e.g., in communications manager circuitry) The circuitry may comprise of processor, DSP, ASIC, FPGA, or other programmable logic device, discrete gate or transistor logic, discrete hardware components, or any combination thereof designed to perform the functions described in the present disclosure.

In another implementation, the communications manager 515, or its sub-components, may be implemented in code (e.g., as communications management software or firmware) executed by a processor, or any combination thereof. If implemented in code executed by a processor, the functions of the communications manager 515, or its sub-components may be executed by a general-purpose processor, a DSP, an ASIC, an FPGA, or other programmable logic device.

In some examples, the communications manager 515 may be configured to perform various operations (e.g., receiving, determining, transmitting) using or otherwise in cooperation with the receiver 510, the transmitter 520, or both.

In some examples, the communications manager 515 may be implemented as an integrated circuit or chipset for a mobile device modem, and a receiver 510 and transmitter 520 may be implemented as analog components (e.g., amplifiers, filters, antennas) coupled with the mobile device modem to enable wireless transmission and reception over one or more bands.

The communications manager 515 as described may be implemented to realize one or more potential advantages. One implementation may allow the device 505 to support feedback control for sidelink groupcast communication. As such, the device 505 may determine device identification and feedback resources and may experience enhanced reliability and efficiency. In some examples, the device 505 may experience a decreased power consumption and increased battery life, among other benefits.

Figure 6:
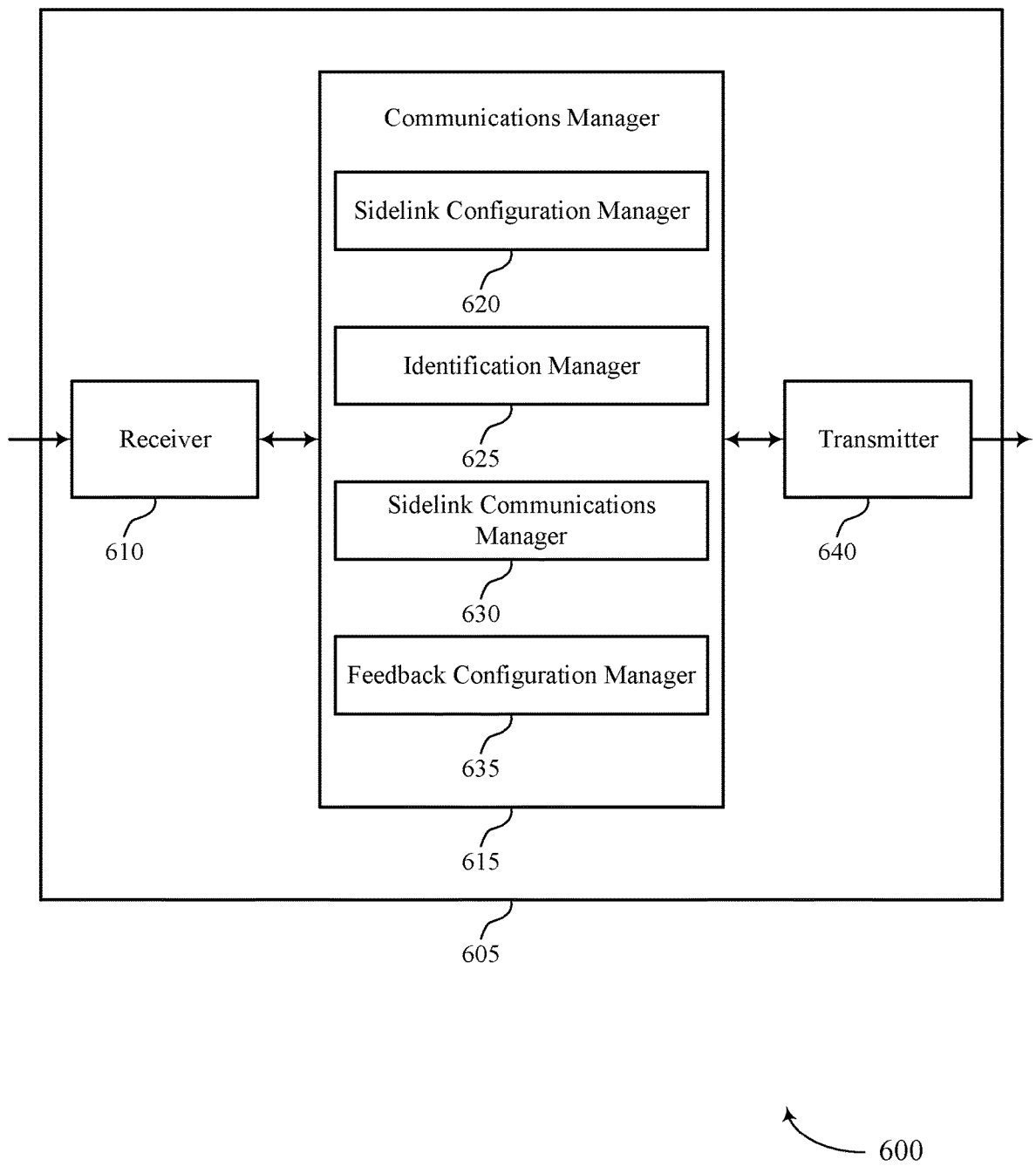

FIG. 6 shows a block diagram 600 of a device 605 that supports sidelink groupcast configuration to support feedback control in accordance with one or more aspects of the present disclosure. The device 605 may be an example of aspects of a device 505, or a UE 115 (e.g., a first UE or a second UE) as described herein. The device 605 may include a receiver 610, a communications manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to sidelink groupcast configuration to support feedback control, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a sidelink configuration manager 620, an identification manager 625, a sidelink communications manager 630, and a feedback configuration manager 635. The communications manager 615 may be an example of aspects of the communications manager 810 described herein.

In some cases, the sidelink configuration manager 620 may receive, from a second UE, sidelink groupcast information of a first sidelink group including, a group size of the first sidelink group, and a member identification of the first UE within the first sidelink group, where the first sidelink group includes a plurality of members including at least the first UE and the second UE. The identification manager 625 may determine, at the first UE, an identification for communication with the first sidelink group based on the sidelink groupcast information. The sidelink communications manager 630 may communicate with the first sidelink group based on the determined identification.

In some cases, the sidelink configuration manager 620 may configure a first sidelink group for sidelink groupcast communications, where the first sidelink group includes a plurality of members including at least the first UE and a second UE. The feedback configuration manager 635 may determine, based on a group size of the first sidelink group, a feedback resource configuration for the sidelink group, where the feedback resource configuration includes a common feedback resource use by the plurality of members or separate feedback resources corresponding to each of the plurality of members. The sidelink communications manager 630 may transmit, to other of the plurality of members of the first sidelink group, sidelink groupcast information that indicates at least the feedback resource configuration and communicate with the first sidelink group based on the determined identification and the feedback resource configuration. The identification manager 625 may determine, at the first UE, an identification for communications with the first sidelink group based on the sidelink groupcast information.

The transmitter 640 may transmit signals generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

Figure 7:
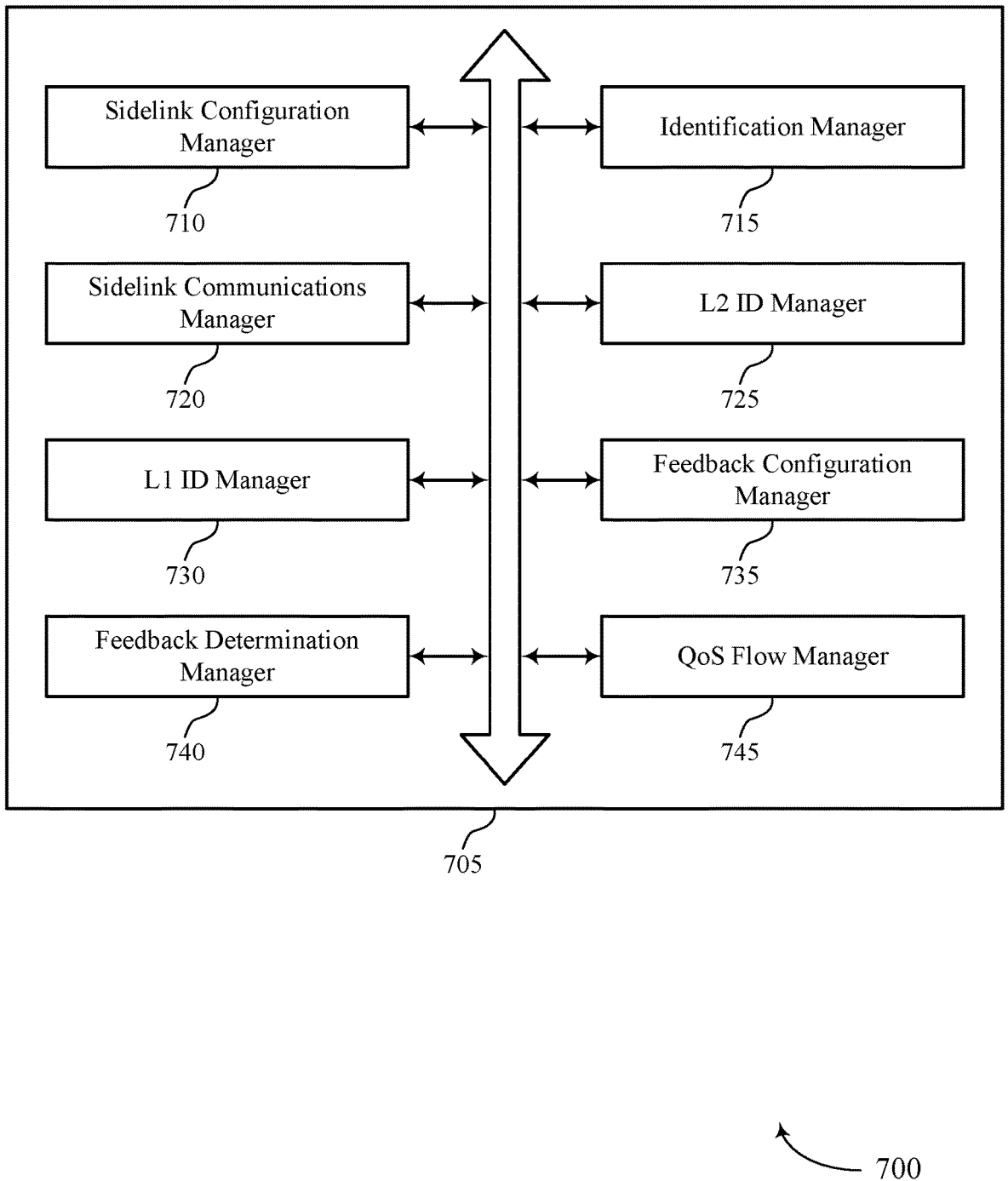
FIG. 7 shows a block diagram of a communications manager that supports sidelink groupcast configuration to support feedback control in accordance with aspects of the present disclosure.

FIG. 7 shows a block diagram 700 of a communications manager 705 that supports sidelink groupcast configuration to support feedback control in accordance with one or more aspects of the present disclosure. The communications manager 705 may be an example of aspects of a communications manager 515, a communications manager 615, or a communications manager 810 described herein. The communications manager 705 may include a sidelink configuration manager 710, an identification manager 715, a sidelink communications manager 720, a L2 ID manager 725, a L1 ID manager 730, a feedback configuration manager 735, a feedback determination manager 740, and a QoS flow manager 745. Each of these modules may communicate, directly or indirectly, with one another (e.g., via one or more buses).

The sidelink configuration manager 710 may receive, from a second UE, sidelink groupcast information of a first sidelink group including, a group size of the first sidelink group, and a member identification of the first UE within the first sidelink group, where the first sidelink group includes a plurality of members including at least the first UE and the second UE. In some cases, the sidelink groupcast information further includes a group identifier of a first sidelink group.

In some examples, the sidelink configuration manager 710 may configure a first sidelink group for sidelink groupcast communications, where the first sidelink group includes a plurality of members including at least the first UE and a second UE. In some cases, the sidelink groupcast information is received at an application layer of the first UE or at a group management mid-ware layer at the first UE. In some cases, the sidelink groupcast information further indicates a group identifier of the first sidelink group, a group size of the first sidelink group, and a corresponding member identification within the first sidelink group of each of the plurality of members.

The identification manager 715 may determine, at the first UE, an identification for communications with the first sidelink group based on the sidelink groupcast information. In some examples, the identification manager 715 may determine a member identification of the first UE.

The sidelink communications manager 720 may communicate with the first sidelink group based on the determined identification.

In some examples, the sidelink communications manager 720 may transmit, to other of the plurality of members of the first sidelink group, sidelink groupcast information that indicates at least the feedback resource configuration. In some examples, the sidelink communications manager 720 may communicate with the first sidelink group based on the determined identification and the feedback resource configuration.

The feedback configuration manager 735 may determine, based on a group size of the first sidelink group and a member identification of the first UE, a feedback resource configuration for the sidelink group, where the feedback resource configuration includes a common feedback resource use by the plurality of members or separate feedback resources corresponding to each of the plurality of members.

In some examples, the feedback configuration manager 735 may determine, based on the group size of the first sidelink group, whether each of the members of the first sidelink group uses separate feedback resources for providing acknowledgment feedback information to other of the members of the first sidelink group.

In some cases, the first UE determines whether separate feedback resources or common feedback resources are used for providing the acknowledgement feedback information based on whether a number of members of the first sidelink group is above a threshold number of members. In some cases, the separate feedback resources are used for providing acknowledgement feedback information when a number of members of the first sidelink group is at or below a threshold number of members. In some cases, the common resources are used for providing acknowledgement feedback information when the number of members of the first sidelink group exceeds the threshold number of members.

In some cases, the first UE determines whether the separate feedback resources or the common feedback resources are used for providing the acknowledgement feedback information based on a pre-configuration of the first UE, control signaling received from another UE or a base station, or any combinations thereof. In some cases, the first UE determines whether separate feedback resources or common feedback resources are used for providing the acknowledgement feedback information based on RRC signaling received at the first UE, a SIB received at the first UE, a MAC control element received at the first UE, or any combinations thereof. In some cases, a number of the separate feedback resources corresponds to a number of members of the first sidelink group minus one.

The L2 ID manager 725 may manage a layer-2 ID of the UE. In some cases, the identification is a destination layer-2 identification, and the member identification of the first UE is included as a first subset of bits of a source layer-2 identification. In some cases, the group identifier is mapped into a second subset of bits of a destination layer-2 identification. In some cases, a number of bits of the first subset of bits is determined based on the group size of the first sidelink group. In some cases, the identification is a source layer-2 identification, and the identification of the first UE is included as a first subset of bits of the source layer-2 identification, and where the group identifier is mapped into a second subset of bits of a destination layer-2 identification. In some cases, a number of bits of the first subset of bits is determined based on the group size of the first sidelink group.

The L1 ID manager 730 may determine a layer-1 identification based on the source layer-2 identification, where the layer-1 identification is indicated in a physical layer control information transmission to the first sidelink group. In some cases, the layer-1 identification corresponds to a subset of the source layer-2 identification that indicates the group identifier of the first sidelink group and the member identification of the first UE within the first sidelink group.

The feedback determination manager 740 may determine, based at least in part on the group size of the first sidelink group and the member identification of the first UE within the first sidelink group, a set of feedback resources for transmitting acknowledgment feedback information to one or more members of the first sidelink group.

In some examples, the feedback determination manager 740 may receive a first groupcast communication from the second UE. In some examples, the feedback determination manager 740 may determine acknowledgment feedback for the first groupcast communication. In some examples, the feedback determination manager 740 may transmit the acknowledgment feedback for the first groupcast communication to the second UE using the set of feedback resources.

In some examples, the feedback determination manager 740 may transmit a groupcast communication to other of the plurality of members of the first sidelink group. In some examples, the feedback determination manager 740 may determine to retransmit the groupcast communication based on the acknowledgment feedback from at least one of the plurality of members of the first sidelink group.

In some examples, the feedback determination manager 740 may determine that at least one of the plurality of members of the first sidelink group provides a negative acknowledgment, determining that an acknowledgment feedback from at least one of the plurality of members of the first sidelink group is not received at the first UE, or any combinations thereof. In some examples, the feedback determination manager 740 may transmit a groupcast communication to other of the plurality of members of the first sidelink group. In some examples, the feedback determination manager 740 may monitor, based on the feedback resource configuration, for acknowledgment feedback from the other of the plurality of members of the first sidelink group.

The QoS flow manager 745 may configure an access stratum layer at the first UE for a QoS flow for groupcast communications associated with a layer-2 identification, and where the access stratum layer determines a QoS flow identification and a QoS context and derives a layer-1 identification for the QoS flow.

Figure 8:
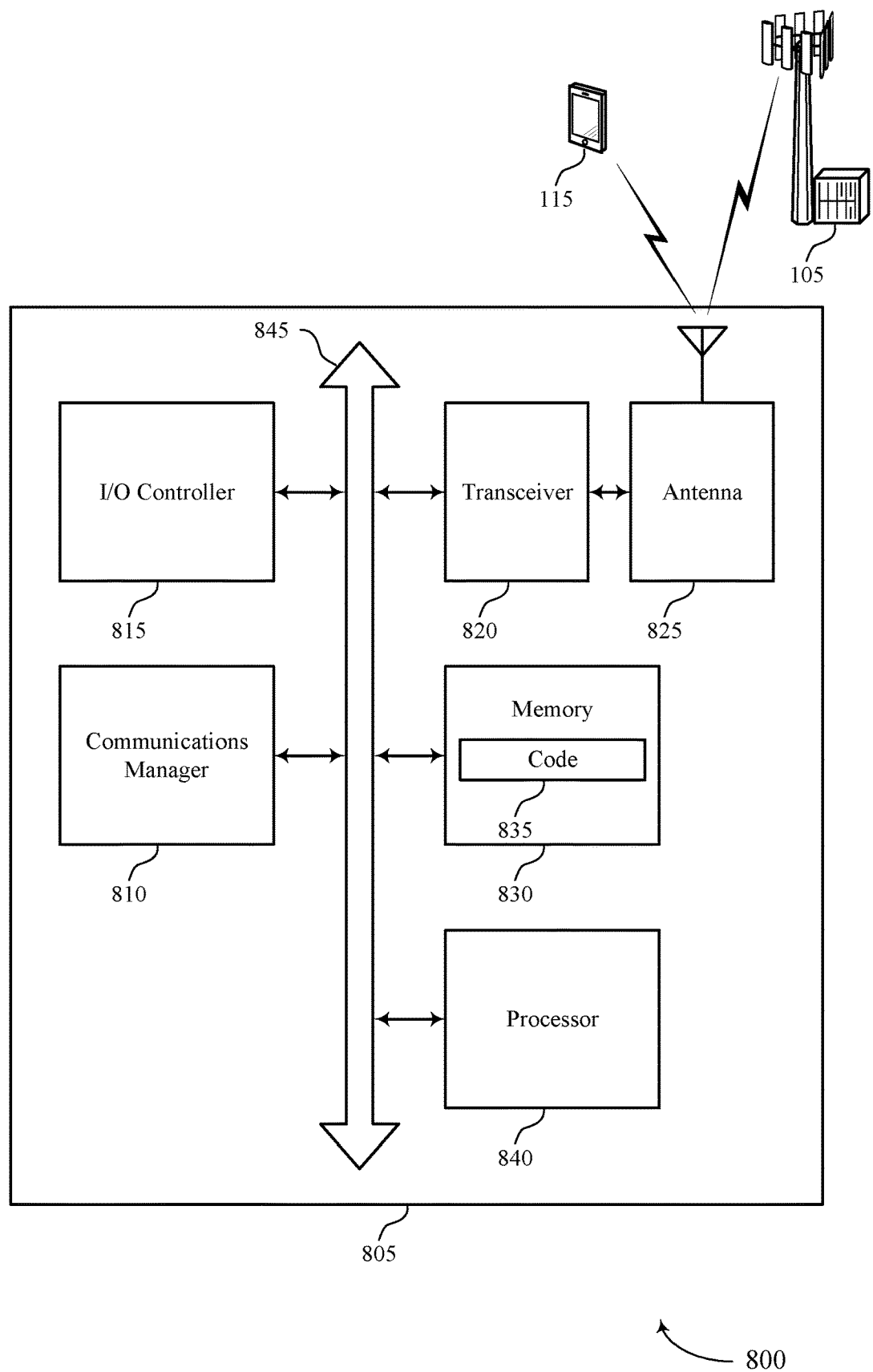
FIG. 8 shows a diagram of a system including a device that supports sidelink groupcast configuration to support feedback control in accordance with aspects of the present disclosure.

FIG. 8 shows a diagram of a system 800 including a device 805 that supports sidelink groupcast configuration to support feedback control in accordance with one or more aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive, from a second UE, sidelink groupcast information of a first sidelink group including, a group size of the first sidelink group, and a member identification of the first UE within the first sidelink group, where the first sidelink group includes a plurality of members including at least the first UE and the second UE, determine, at the first UE, an identification for communication with the first sidelink group based on the sidelink groupcast information, and communicate with the first sidelink group based on the determined identification.

The communications manager 810 may also configure a first sidelink group for sidelink groupcast communications, where the first sidelink group includes a plurality of members including at least the first UE and a second UE, determine a member identification of the first UE, determine, based on a group size of the first sidelink group and the determined member identification of the first UE, a feedback resource configuration for the sidelink group, where the feedback resource configuration includes a common feedback resource use by the plurality of members or separate feedback resources corresponding to each of the plurality of members, transmit, to other of the plurality of members of the first sidelink group, sidelink groupcast information that indicates at least the feedback resource configuration, communicate with the first sidelink group based on the determined identification and the feedback resource configuration, and determine, at the first UE, an identification for communication with the first sidelink group based on the sidelink groupcast information.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic input/output system (BIOS) which may control basic hardware or software operation such as the interaction with peripheral components or devices.

The processor 840 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting sidelink groupcast configuration to support feedback control).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
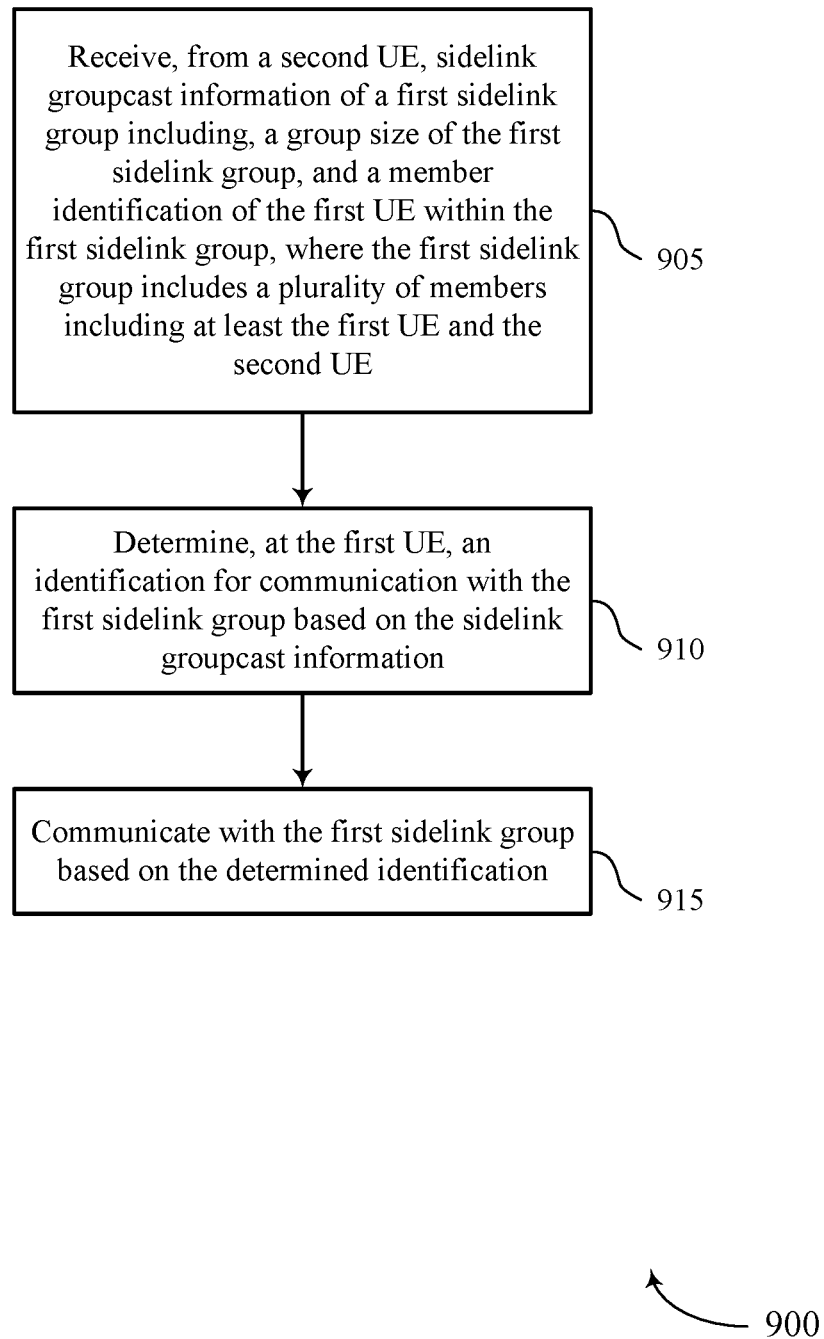
FIGS. 9 through 14 show flowcharts illustrating methods that support sidelink groupcast configuration to support feedback control in accordance with aspects of the present disclosure.

FIG. 9 shows a flowchart illustrating a method 900 that supports sidelink groupcast configuration to support feedback control in accordance with one or more aspects of the present disclosure. The operations of method 900 may be implemented by a UE 115 or its components as described herein. For example, the operations of method 900 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 905, the UE may receive, from a second UE, sidelink groupcast information of a first sidelink group including, a group size of the first sidelink group, and a member identification of the first UE within the first sidelink group, where the first sidelink group includes a plurality of members including at least the first UE and the second UE. The operations of 905 may be performed according to the methods described herein. In some examples, aspects of the operations of 905 may be performed by a sidelink configuration manager as described with reference to FIGS. 5 through 8.

At 910, the UE may determine an identification for communication with the first sidelink group based on the sidelink groupcast information. The operations of 910 may be performed according to the methods described herein. In some examples, aspects of the operations of 910 may be performed by an identification manager as described with reference to FIGS. 5 through 8.

At 915, the UE may communicate with the first sidelink group based on the determined identification. The operations of 915 may be performed according to the methods described herein. In some examples, aspects of the operations of 915 may be performed by a sidelink communications manager as described with reference to FIGS. 5 through 8.

Figure 10:
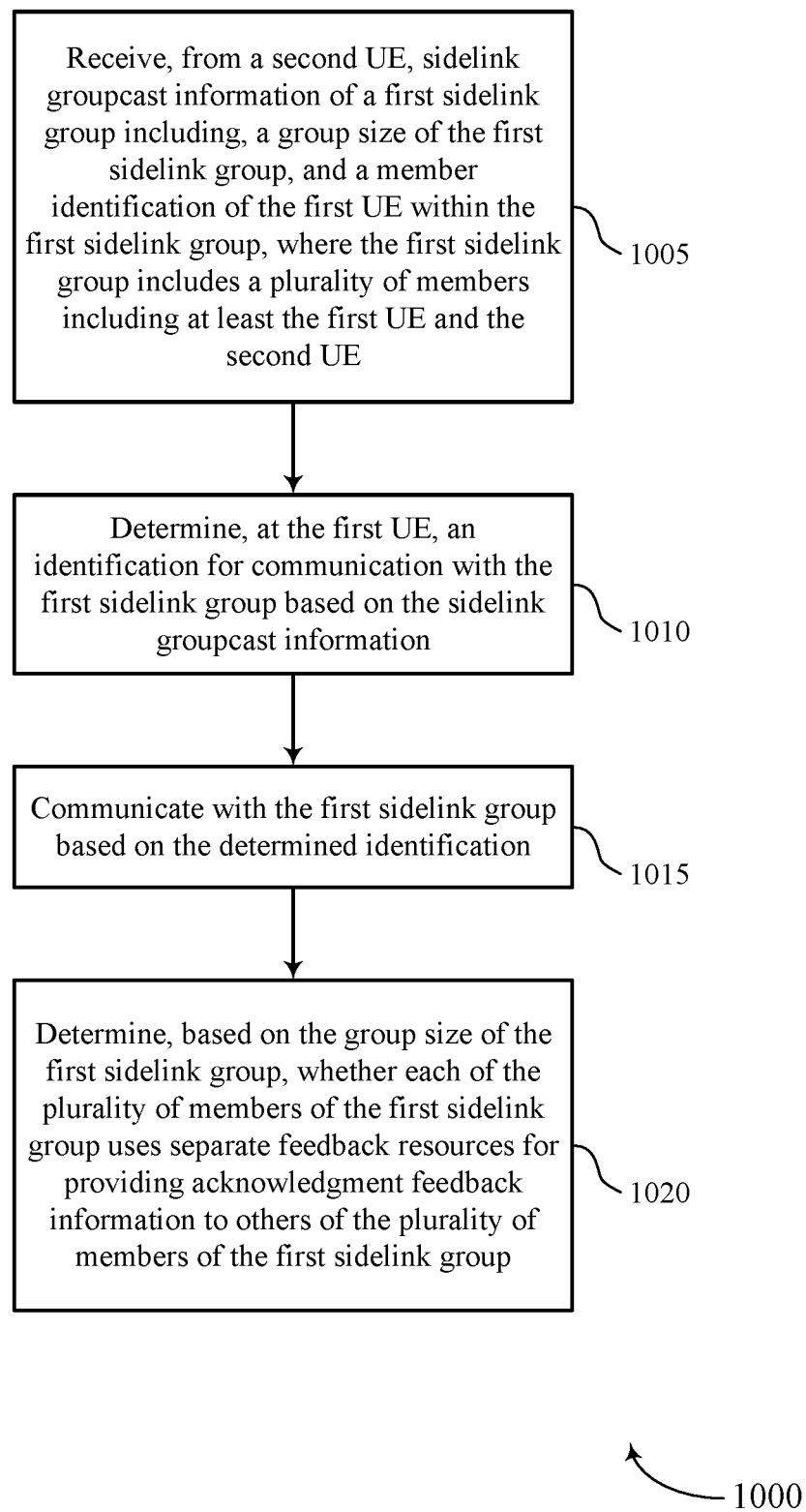

FIG. 10 shows a flowchart illustrating a method 1000 that supports sidelink groupcast configuration to support feedback control in accordance with one or more aspects of the present disclosure. The operations of method 1000 may be implemented by a UE 115 or its components as described herein. For example, the operations of method 1000 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1005, the UE may receive, from a second UE, sidelink groupcast information of a first sidelink group including, a group size of the first sidelink group, and a member identification of the first UE within the first sidelink group, where the first sidelink group includes a plurality of members including at least the first UE and the second UE. The operations of 1005 may be performed according to the methods described herein. In some examples, aspects of the operations of 1005 may be performed by a sidelink configuration manager as described with reference to FIGS. 5 through 8.

At 1010, the UE may determine an identification for communication with the first sidelink group based on the sidelink groupcast information. The operations of 1010 may be performed according to the methods described herein. In some examples, aspects of the operations of 1010 may be performed by an identification manager as described with reference to FIGS. 5 through 8.

At 1015, the UE may communicate with the first sidelink group based on the determined identification. The operations of 1015 may be performed according to the methods described herein. In some examples, aspects of the operations of 1015 may be performed by a sidelink communications manager as described with reference to FIGS. 5 through 8.

At 1020, the UE may determine, based on the group size of the first sidelink group, whether each of the plurality of members of the first sidelink group uses separate feedback resources for providing acknowledgment feedback information to other of the plurality of members of the first sidelink group. The operations of 1020 may be performed according to the methods described herein. In some examples, aspects of the operations of 1020 may be performed by a feedback configuration manager as described with reference to FIGS. 5 through 8.

Figure 11:
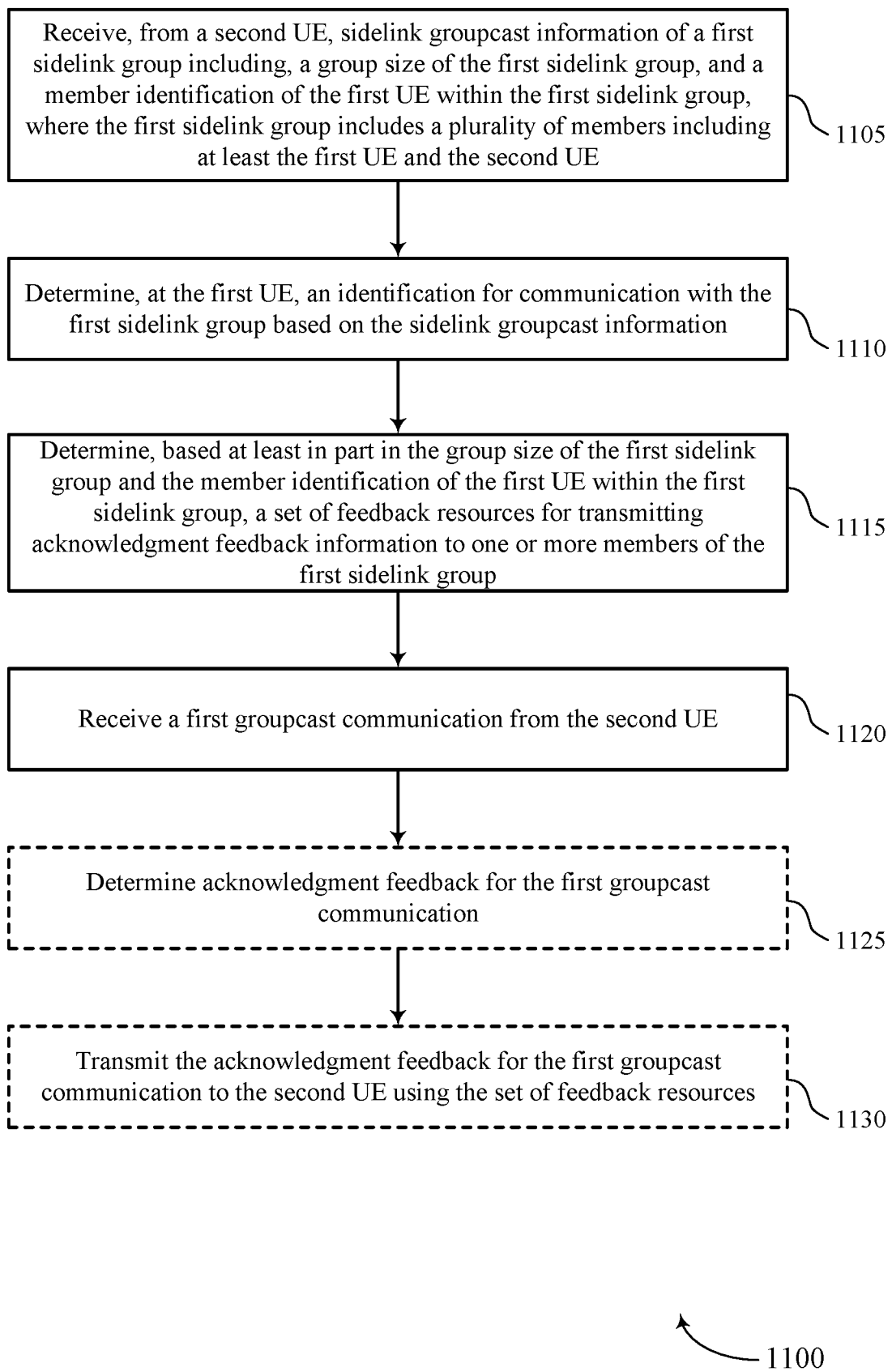

FIG. 11 shows a flowchart illustrating a method 1100 that supports sidelink groupcast configuration to support feedback control in accordance with one or more aspects of the present disclosure. The operations of method 1100 may be implemented by a UE 115 or its components as described herein. For example, the operations of method 1100 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1105, the UE may receive, from a second UE, sidelink groupcast information of a first sidelink group including, a group size of the first sidelink group, and a member identification of the first UE within the first sidelink group, where the first sidelink group includes a plurality of members including at least the first UE and the second UE. The operations of 1105 may be performed according to the methods described herein. In some examples, aspects of the operations of 1105 may be performed by a sidelink configuration manager as described with reference to FIGS. 5 through 8.

At 1110, the UE may determine an identification for communication with the first sidelink group based on the sidelink groupcast information. The operations of 1110 may be performed according to the methods described herein. In some examples, aspects of the operations of 1110 may be performed by an identification manager as described with reference to FIGS. 5 through 8.

At 1115, the UE may determine, based at least in part on the group size of the first sidelink group and the member identification of the first UE within the first sidelink group, a set of feedback resources for transmitting acknowledgment feedback information to one or more members of the first sidelink group. The operations of 1115 may be performed according to the methods described herein. In some examples, aspects of the operations of 1115 may be performed by a feedback determination manager as described with reference to FIGS. 5 through 8.

At 1120, the UE may receive a first groupcast communication from the second UE. The operations of 1120 may be performed according to the methods described herein. In some examples, aspects of the operations of 1120 may be performed by a feedback determination manager as described with reference to FIGS. 5 through 8.

At 1125, the UE may determine acknowledgment feedback for the first groupcast communication. The operations of 1125 may be performed according to the methods described herein. In some examples, aspects of the operations of 1125 may be performed by a feedback determination manager as described with reference to FIGS. 5 through 8.

At 1130, the UE may transmit the acknowledgment feedback for the first groupcast communication to the second UE using the set of feedback resources. The operations of 1130 may be performed according to the methods described herein. In some examples, aspects of the operations of 1130 may be performed by a feedback determination manager as described with reference to FIGS. 5 through 8.

Figure 12:
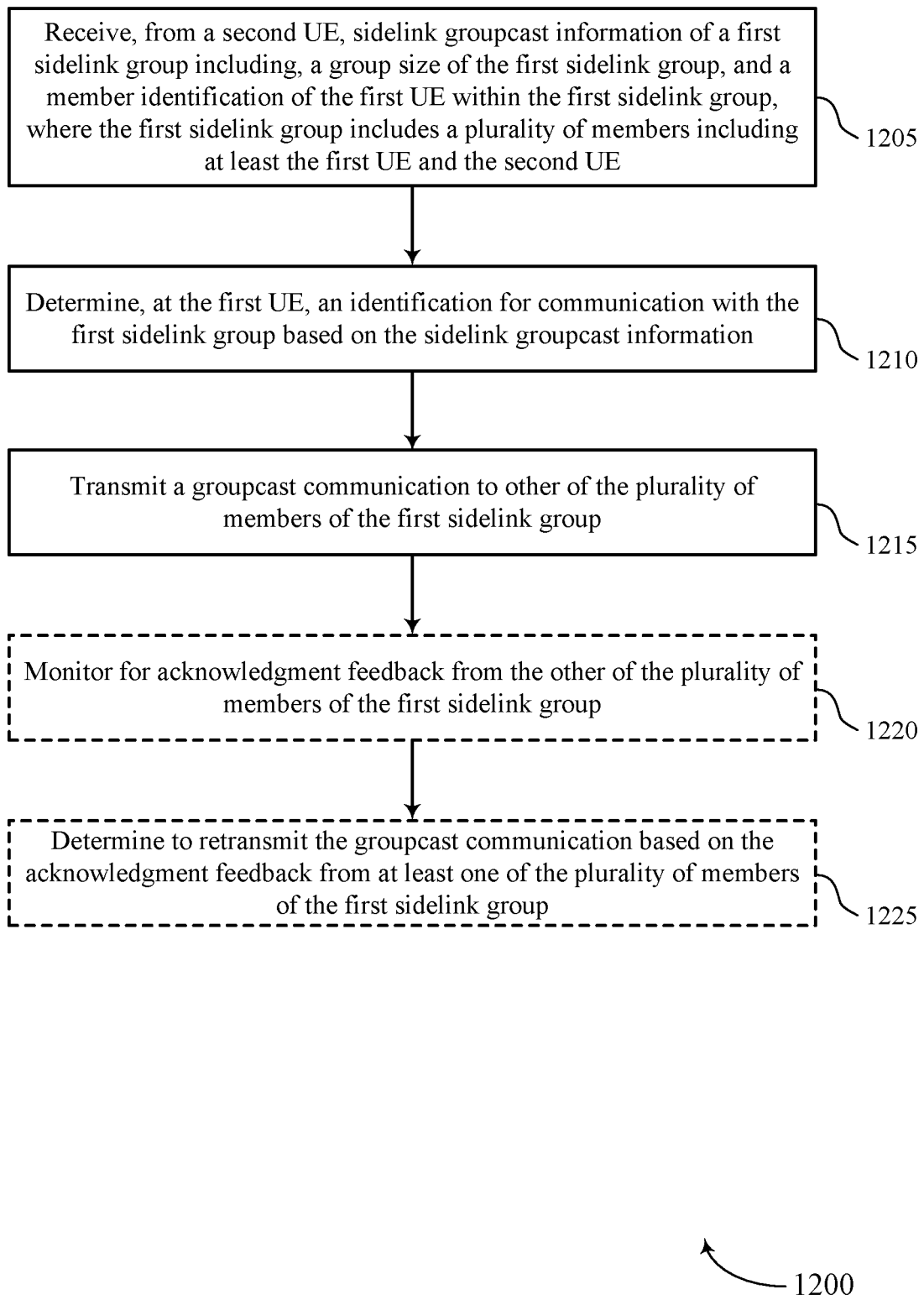

FIG. 12 shows a flowchart illustrating a method 1200 that supports sidelink groupcast configuration to support feedback control in accordance with one or more aspects of the present disclosure. The operations of method 1200 may be implemented by a UE 115 or its components as described herein. For example, the operations of method 1200 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1205, the UE may receive, from a second UE, sidelink groupcast information of a first sidelink group including, a group size of the first sidelink group, and a member identification of the first UE within the first sidelink group, where the first sidelink group includes a plurality of members including at least the first UE and the second UE. The operations of 1205 may be performed according to the methods described herein. In some examples, aspects of the operations of 1205 may be performed by a sidelink configuration manager as described with reference to FIGS. 5 through 8.

At 1210, the UE may determine an identification for communication with the first sidelink group based on the sidelink groupcast information. The operations of 1210 may be performed according to the methods described herein. In some examples, aspects of the operations of 1210 may be performed by an identification manager as described with reference to FIGS. 5 through 8.

At 1215, the UE may transmit a groupcast communication to other of the plurality of members of the first sidelink group. The operations of 1215 may be performed according to the methods described herein. In some examples, aspects of the operations of 1215 may be performed by a feedback determination manager as described with reference to FIGS. 5 through 8.

At 1220, the UE may monitor for acknowledgment feedback from the other of the plurality of members of the first sidelink group. The operations of 1220 may be performed according to the methods described herein. In some examples, aspects of the operations of 1220 may be performed by a feedback determination manager as described with reference to FIGS. 5 through 8.

At 1225, the UE may determine to retransmit the groupcast communication based on the acknowledgment feedback from at least one of the plurality of members of the first sidelink group. The operations of 1225 may be performed according to the methods described herein. In some examples, aspects of the operations of 1225 may be performed by a feedback determination manager as described with reference to FIGS. 5 through 8.

Figure 13:
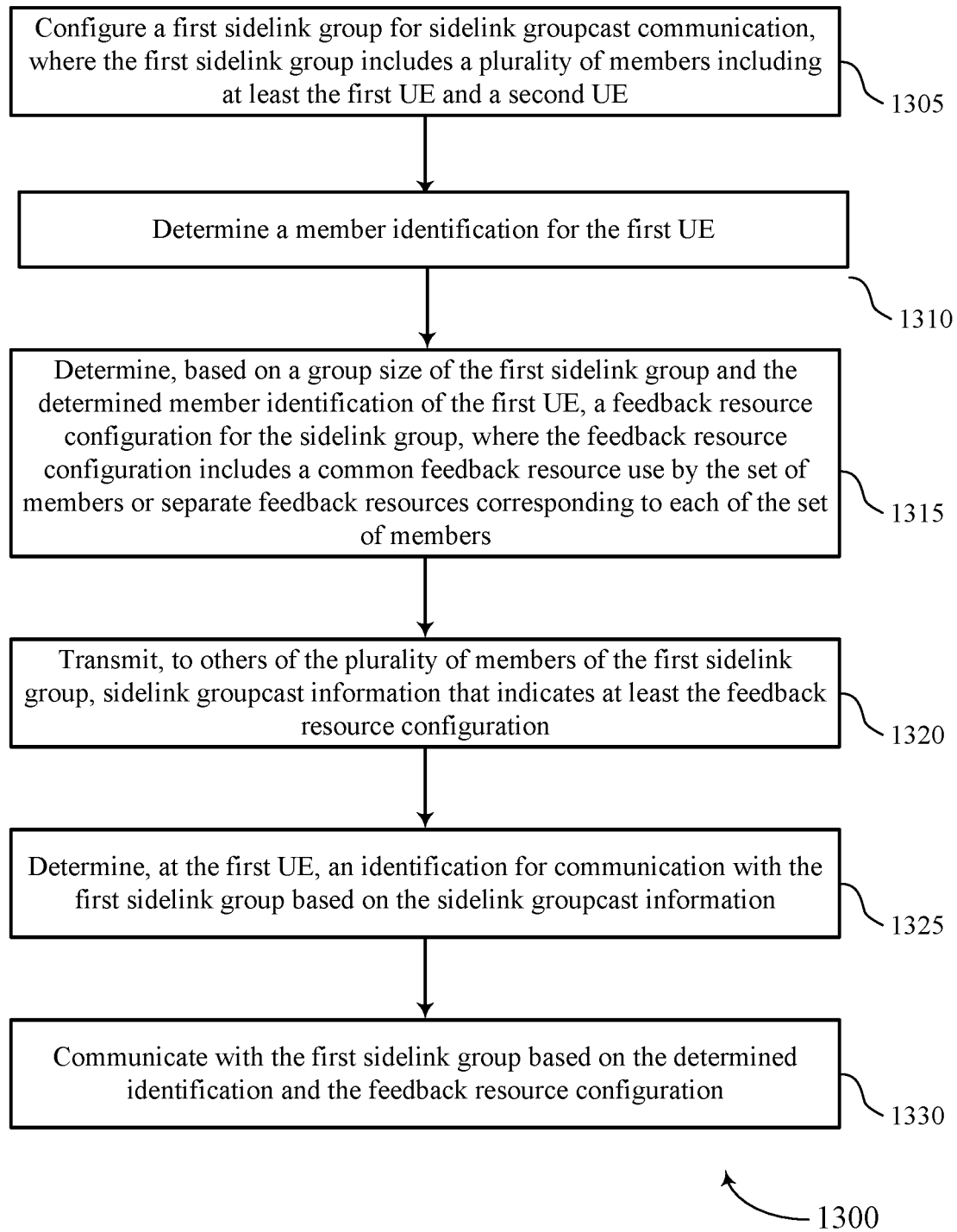

FIG. 13 shows a flowchart illustrating a method 1300 that supports sidelink groupcast configuration to support feedback control in accordance with one or more aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may configure a first sidelink group for sidelink groupcast communication, where the first sidelink group includes a plurality of members including at least the first UE and a second UE. The operations of 1305 may be performed according to the methods described herein. In some examples, aspects of the operations of 1305 may be performed by a sidelink configuration manager as described with reference to FIGS. 5 through 8.

At 1310, the UE may determine a member identification for the first UE. The operations of the 1310 may be performed according to the methods described herein. In some examples, aspects of the operations of 1310 may be performed by an identification manager as described with reference to FIGS. 5 through 8.

At 1315, the UE may determine, based on a group size of the first sidelink group and the determined member identification of the first UE, a feedback resource configuration for the sidelink group, where the feedback resource configuration includes a common feedback resource used by the plurality of members or separate feedback resources corresponding to each of the plurality of members. The operations of 1315 may be performed according to the methods described herein. In some examples, aspects of the operations of 1315 may be performed by a feedback configuration manager as described with reference to FIGS. 5 through 8.

At 1320, the UE may transmit, to other of the plurality of members of the first sidelink group, sidelink groupcast information that indicates at least the feedback resource configuration. The operations of 1320 may be performed according to the methods described herein. In some examples, aspects of the operations of 1320 may be performed by a sidelink communications manager as described with reference to FIGS. 5 through 8.

At 1325, the UE may determine an identification for communication with the first sidelink group based on the sidelink groupcast information. The operations of 1325 may be performed according to the methods described herein. In some examples, aspects of the operations of 1325 may be performed by an identification manager as described with reference to FIGS. 5 through 8.

At 1330, the UE may communicate with the first sidelink group based on the determined identification and the feedback resource configuration. The operations of 1330 may be performed according to the methods described herein. In some examples, aspects of the operations of 1330 may be performed by a sidelink communications manager as described with reference to FIGS. 5 through 8.

Figure 14:
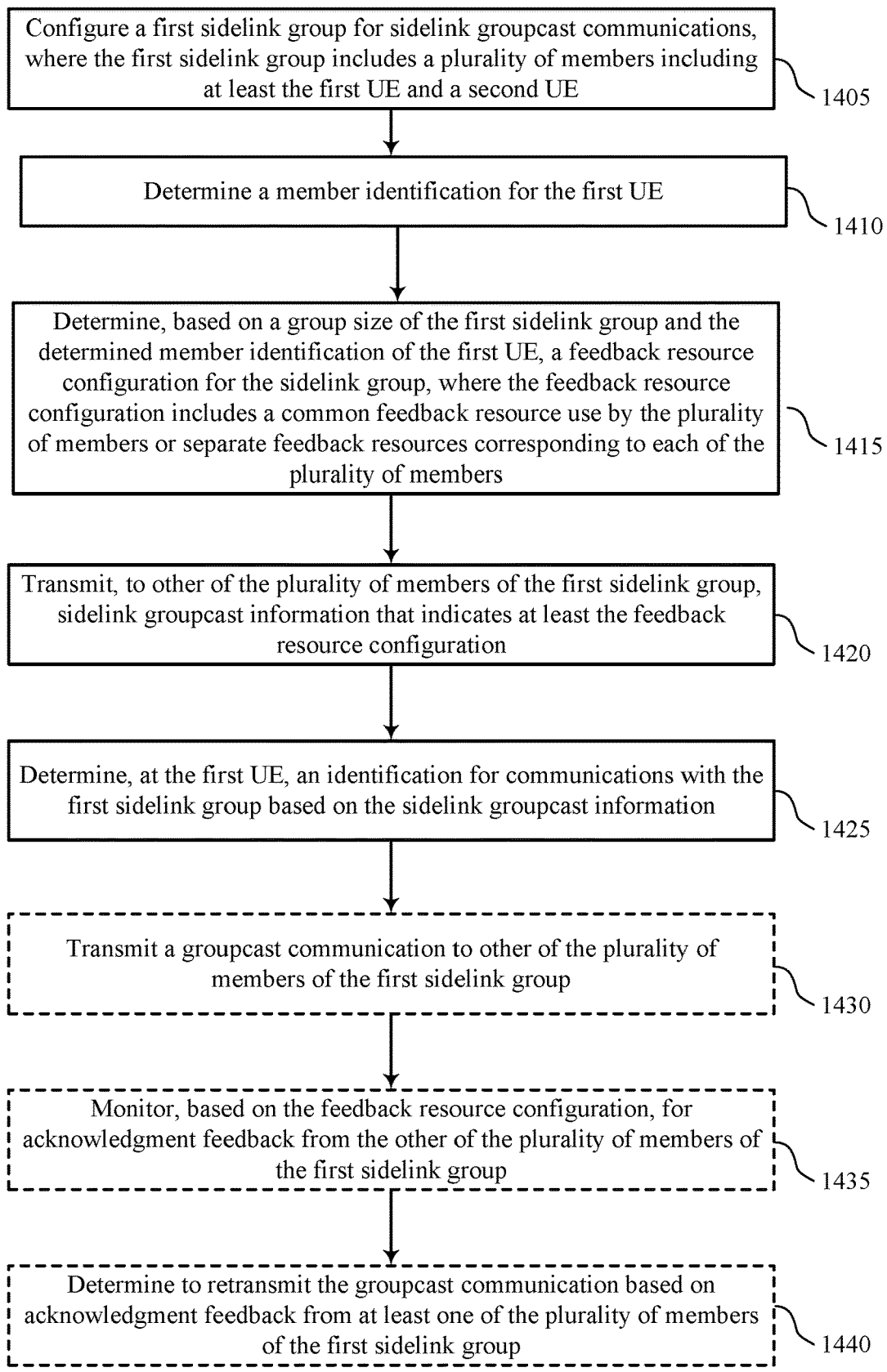

FIG. 14 shows a flowchart illustrating a method 1400 that supports sidelink groupcast configuration to support feedback control in accordance with one or more aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may configure a first sidelink group for sidelink groupcast communications, where the first sidelink group includes a plurality of members including at least the first UE and a second UE. The operations of 1405 may be performed according to the methods described herein. In some examples, aspects of the operations of 1405 may be performed by a sidelink configuration manager as described with reference to FIGS. 5 through 8.

At 1410, the UE may determine a member identification for the first UE. The operations of the 1410 may be performed according to the methods described herein. In some examples, aspects of the operations of 1410 may be performed by an identification manager as described with reference to FIGS. 5 through 8.

At 1415, the UE may determine, based on a group size of the first sidelink group, a feedback resource configuration for the sidelink group, where the feedback resource configuration includes a common feedback resource used by the plurality of members or separate feedback resources corresponding to each of the plurality of members. The operations of 1415 may be performed according to the methods described herein. In some examples, aspects of the operations of 1415 may be performed by a feedback configuration manager as described with reference to FIGS. 5 through 8.

At 1420, the UE may transmit, to other of the plurality of members of the first sidelink group, sidelink groupcast information that indicates at least the feedback resource configuration. The operations of 1420 may be performed according to the methods described herein. In some examples, aspects of the operations of 1420 may be performed by a sidelink communications manager as described with reference to FIGS. 5 through 8.

At 1425, the UE may determine an identification for communications with the first sidelink group based on the sidelink groupcast information. The operations of 1425 may be performed according to the methods described herein. In some examples, aspects of the operations of 1425 may be performed by an identification manager as described with reference to FIGS. 5 through 8.

At 1430, the UE may transmit a groupcast communication to other of the plurality of members of the first sidelink group. The operations of 1430 may be performed according to the methods described herein. In some examples, aspects of the operations of 1430 may be performed by a feedback determination manager as described with reference to FIGS. 5 through 8.

At 1435, the UE may monitor, based on the feedback resource configuration, for acknowledgment feedback from the other of the plurality of members of the first sidelink group. The operations of 1435 may be performed according to the methods described herein. In some examples, aspects of the operations of 1435 may be performed by a feedback determination manager as described with reference to FIGS. 5 through 8. In some cases, separate feedback resources are used for providing acknowledgement feedback information when a number of the plurality of members of the first sidelink group is at or below a threshold number of members. In some cases, common resources are used for providing acknowledgement feedback information when the number of the plurality of members of the first sidelink group exceeds the threshold number of members.

At 1440, the UE may determine to retransmit the groupcast communication based on acknowledgment feedback from at least one of the plurality of members of the first sidelink group. The operations of 1440 may be performed according to the methods described herein. In some examples, aspects of the operations of 1440 may be performed by a feedback determination manager as described with reference to FIGS. 5 through 8.

The following provides an overview of examples of the present disclosure:

Example 1: A method for wireless communication at a first UE, comprising: receiving, from a second UE, sidelink groupcast information of a first sidelink group including, a group size of the first sidelink group, and a member identification of the first UE within the first sidelink group, wherein the first sidelink group includes a plurality of members including at least the first UE and the second UE; determining, at the first UE, an identification for communication with the first sidelink group based at least in part on the sidelink groupcast information; and communicating with the first sidelink group based at least in part on the determined identification.

Example 2: The method example 1, further comprising: determining, based at least in part on the group size of the first sidelink group, whether each of the plurality of members of the first sidelink group uses separate feedback resources for providing acknowledgement feedback information to other of the plurality of members of the first sidelink group.

Example 3: The method of example 2, wherein the first UE determines whether separate feedback resources or common feedback resources are used for providing the acknowledgement feedback information based at least in part on whether a number of the plurality of members of the first sidelink group is above a threshold number of members.

Example 4: The method of example 2: wherein the first UE determines whether separate feedback resources or common feedback resources are used for providing the acknowledgement feedback information based at least in part on a pre-configuration of the first UE, control signaling received from another UE or a base station, or any combination thereof.

Example 5: The method of example 2, wherein the first UE determines whether separate feedback resources or common feedback resources are used for providing the acknowledgement feedback information based at least in part on RRC signaling received at the first UE, an SIB received at the first UE, a MAC control element received at the first UE, or any combination thereof.

Example 6: The method of any of examples 1 through 5, wherein the identification is a source layer-2 identification, and the member identification of the first UE is included as a first subset of bits of the source layer-2 identification.

Example 7: The method of any of examples 1 through 6, wherein the sidelink groupcast information further includes a group identifier of a first sidelink group.

Example 8: The method of example 7, wherein the group identifier is mapped into a second subset of bits of a destination layer-2 identification.

Example 9: The method of any of examples 6 through 8, further comprising: determining a layer-1 identification based at least in part on the source layer-2 identification, wherein the layer-1 identification is indicated in a physical layer control information transmission to the first sidelink group.

Example 10: The method of example 9, wherein the layer-1 identification corresponds to a subset of the source layer-2 identification that indicates the member identification of the first UE within the first sidelink group.

Example 11: The method of any of examples 6 through 8, wherein a number of bits of the first subset of bits is determined based at least in part on the group size of the first sidelink group.

Example 12: The method of any of examples 1 through 11, further comprising: determining, based at least in part on the group size of the first sidelink group and the member identification of the first UE within the first sidelink group, a set of feedback resources for transmitting acknowledgement feedback information to one or more members of the first sidelink group.

Example 13: The method of example 12, further comprising: receiving a first groupcast communication from the second UE; determining acknowledgement feedback for the first groupcast communication; and transmitting the acknowledgement feedback for the first groupcast communication to the second UE using the set of feedback resources.

Example 14: The method of any of example 1 through 13, further comprising: transmitting a groupcast communication to other of the plurality of members of the first sidelink group; monitoring for acknowledgement feedback from the other of the plurality of members of the first sidelink group; and determining to retransmit the groupcast communication based at least in part on the acknowledgement feedback from at least one of the plurality of members of the first sidelink group.

Example 15: The method of example 14, wherein the determining to retransmit further comprises: determining that at least one of the plurality of members of the first sidelink group provides a negative acknowledgment, determining that an acknowledgment feedback from at least one of the plurality of members of the first sidelink group is not received at the first UE, or any combination thereof.

Example 16: The method any of examples 1 through 15, further comprising: configuring an access stratum layer at the first UE for a QoS flow for groupcast communications associated with a layer-2 identification, and wherein the access stratum layer determines a QoS flow identification and a QoS context and derives a layer-2 identification for the QoS flow.

Example 17: The method of any of examples 1 through 16, wherein the sidelink groupcast information is received at an application layer of the first UE or at a group management mid-ware layer at the first UE.

Example 18: A method for wireless communication at a first UE, comprising: configuration a first sidelink group for sidelink groupcast communication, wherein the first sidelink group includes a plurality of members including at least the first UE and a second UE; determining a member identification of the first UE; determining, based at least in part on a group size of the first sidelink group and the determined member identification of the first UE, a feedback resource configuration for the sidelink group; transmitting, to other of the plurality of members of the first sidelink group, sidelink groupcast information that indicates at least the feedback resource configuration; determining, at the first UE, an identification for communication with the first sidelink group based at least in part on the sidelink groupcast information; and communicating with the first sidelink group based at least in part on the determined identification and the feedback resource configuration.

Example 19: The method of example 18, wherein the feedback resource configuration includes a common feedback resource used by the plurality of members or separate feedback resources corresponding to each of the plurality of members.

Example 20: The method of example 19, wherein the separate feedback resources are used for providing acknowledgment feedback information when a number of the plurality of members of the first sidelink group is at or below a threshold number of members; and the common resources are used for providing acknowledgment feedback information when the number of the plurality of members of the first sidelink group exceeds the threshold number of members.

Example 21: The method of any of examples 19 or 20, further comprising: transmitting a groupcast communication to other of the plurality of members of the first sidelink group; monitoring, based at least in part on the feedback resource configuration, for acknowledgment feedback from the other of the plurality of members of the first sidelink group; and determining to retransmit the groupcast communication based at least in part on acknowledgment feedback from at least one of the plurality of members of the first sidelink group.

Example 20: The method of example 21, wherein the determining to retransmit further comprising: determining that at least one of the plurality of members of the first sidelink group provides a negative acknowledgment, determining that an acknowledgment feedback from at least one the plurality of members of the first sidelink group is not received at the first UE, or any combination thereof.

Example 23: The method of any of examples 18 through 22, wherein the first UE determines whether the separate feedback resources or the common feedback resources are used for providing the acknowledgment feedback information based at least in part on a pre-configuration of the first UE, control signaling received from another E or a base station, or any combination thereof.

Example 24: The method of any of examples 18 through 22, wherein the first UE determines whether separate feedback resources or common feedback resources are used for providing the acknowledgement feedback information based at least in part on RRC signaling received at the first UE, an SIB received at the first UE, a MAC control element received at the first UE, or any combination thereof.

Example 25: The method of any of examples 18 through 24, wherein a number of the separate feedback resources corresponds to a number of the plurality of members of the first sidelink group minus one.

Example 26: The method of any of examples 18 through 25, wherein the sidelink groupcast information further indicates a group identifier of the first sidelink group, a group size of the first sidelink group, and a corresponding member identification within the first sidelink group of each of the plurality of members.

Example 27: The method of example 26, wherein the identification is a source layer-2 identification, and the identification of the first UE is included as a first subset of bits of the source layer-2 identification, and wherein the group identifier is mapped into a second subset of bits of a destination layer-2 identification.

Example 28: The method of example 27, further comprising: determining a layer-1 identification based at least in part on the source layer-2 identification, wherein the layer-1 identification is indicated in a physical layer control information transmission to the first sidelink group.

Example 29: The method of example 28, wherein the layer-1 identification corresponds to a subset of the source layer-2 identification.

Example 30: An apparatus for wireless communication comprising a processor and memory coupled to the processor, the processor and memory configured to perform a method of any one of examples 1 through 17.

Example 31: An apparatus for wireless communication comprising a processor and memory coupled to the processor, the process and memory configured to perform a method of any one of examples 18 through 29.

Example 32: An apparatus for wireless communication comprising at least one means for performing a method of any one of examples 1 through 17.

Example 33: An apparatus for wireless communication comprising at least one means for performing a method of any one of examples 18 through 29.

Example 34: A non-transitory computer-readable medium storing code for wireless communication, the code comprising instructions executable by a process to perform a method of any one of examples 1 through 17.

Example 35: A non-transitory computer-readable medium storing code for wireless communication, the code comprising instructions executable by a processor to perform a method of any one of examples 18 through 29.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as CDMA, time division multiple access (TDMA), frequency division multiple access (FDMA), OFDMA, single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell may cover a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first user equipment (UE), comprising:
receiving sidelink groupcast information of a first sidelink group, the sidelink groupcast information including a group size of the first sidelink group, and a member identification of the first UE within the first sidelink group, wherein the first sidelink group includes at least the first UE and a second UE;
determining, at the first UE, an identification for communication with the first sidelink group;
determining a feedback resource configuration corresponding to common feedback resources associated with the first sidelink group based at least in part on the group size of the first sidelink group exceeding a threshold; and
communicating with the first sidelink group based at least in part on the identification for communication.

2. The method of claim 1, wherein the first UE determines that the feedback resource configuration corresponds to the common feedback resources used for providing feedback based at least in part on a configuration of the first UE, control signaling received from another UE or a network device, or any combination thereof.

3. The method of claim 1, wherein the first UE determines that the feedback resource configuration corresponds to the common feedback resources used for providing feedback based at least in part on radio resources control (RRC) signaling received at the first UE, a system information block (SIB) received at the first UE, a medium access control (MAC) control element received at the first UE, or any combination thereof.

4. The method of claim 1, wherein the member identification of the first UE is included as a subset of bits of a source layer-2 identification.

5. The method of claim 1, wherein the sidelink groupcast information further includes a group identifier of the first sidelink group, and wherein the identification for communication is a destination layer-2 identification based at least in part on the group identifier.

6. The method of claim 5, wherein the group identifier is mapped into a subset of bits of the destination layer-2 identification.

7. The method of claim 4, further comprising:
determining a layer-1 identification based at least in part on the source layer-2 identification, wherein the layer-1 identification is indicated in a physical layer control information transmission to the first sidelink group.

8. The method of claim 7, wherein the layer-1 identification corresponds to a subset of the source layer-2 identification that indicates the member identification of the first UE within the first sidelink group.

9. The method of claim 4, wherein a quantity of bits of the subset of bits is determined based at least in part on the group size of the first sidelink group.

10. The method of claim 1, further comprising:
determining, based at least in part on the group size of the first sidelink group and the member identification of the first UE within the first sidelink group, a set of feedback resources for transmitting feedback to one or more members of the first sidelink group.

11. The method of claim 10, further comprising:
receiving a first groupcast communication from the second UE;
determining feedback for the first groupcast communication; and
transmitting the feedback for the first groupcast communication to the second UE using the set of feedback resources.

12. The method of claim 1, further comprising:
transmitting a groupcast communication to other members of the first sidelink group;
monitoring for feedback from the other members of the first sidelink group; and
determining to retransmit the groupcast communication based at least in part on the feedback from at least one of the other members of the first sidelink group.

13. The method of claim 12, wherein determining to retransmit further comprises:
determining that at least one of the other members of the first sidelink group provides a negative acknowledgment via the feedback, determining that the feedback from at least one of the other members of the first sidelink group is not received at the first UE, or any combination thereof.

14. The method of claim 1, further comprising:
configuring an access stratum layer at the first UE for a quality of service (QoS) flow for a groupcast communications associated with a layer-2 identification.

15. The method of claim 1, wherein the sidelink groupcast information is received at an application layer of the first UE.

16. A method for wireless communication at a first user equipment (UE), comprising:
configuring a first sidelink group for sidelink groupcast communication, wherein the first sidelink group includes at least the first UE and a second UE;
determining a member identification of the first UE;
determining, based at least in part on the member identification of the first UE, a feedback resource configuration corresponding to common feedback resources associated with the first sidelink group based at least in part on a group size of the first sidelink group exceeding a threshold;
transmitting, to other members of the first sidelink group, sidelink groupcast information that indicates at least the feedback resource configuration;
determining, at the first UE, an identification for communication with the first sidelink group; and
communicating with the first sidelink group based at least in part on the identification for communication and the feedback resource configuration.

17. The method of claim 16, further comprising:
transmitting a groupcast communication to the other members of the first sidelink group;
monitoring, based at least in part on the feedback resource configuration, for feedback from the other members of the first sidelink group; and
determining to retransmit the groupcast communication based at least in part on feedback from at least one of the other members of the first sidelink group.

18. The method of claim 17, wherein determining to retransmit further comprises:
determining that at least one of the other members of the first sidelink group provides a negative acknowledgment via the feedback, determining that feedback from at least one of the other members of the first sidelink group is not received at the first UE, or any combination thereof.

19. The method of claim 16, wherein the first UE determines that the feedback resource configuration corresponds to the common feedback resources based at least in part on a configuration of the first UE, control signaling received from another UE or a network device, or any combination thereof.

20. The method of claim 16, wherein the first UE determines that the feedback resource configuration corresponds to the common feedback resources based at least in part on radio resources control (RRC) signaling received at the first UE, a system information block (SIB) received at the first UE, a medium access control (MAC) control element received at the first UE, or any combination thereof.

21. The method of claim 16, wherein the sidelink groupcast information further indicates a group identifier of the first sidelink group, the group size of the first sidelink group, and a corresponding member identification within the first sidelink group of each of the other members.

22. An apparatus for wireless communication at a first user equipment (UE), comprising:
  at least one processor; and
  at least one memory coupled to the at least one processor, the at least one processor configured to cause the first UE to:
    receive sidelink groupcast information of a first sidelink group, the sidelink groupcast information including a group size of the first sidelink group, and a member identification of the first UE within the first sidelink group, wherein the first sidelink group includes at least the first UE and a second UE;
    determine, at the first UE, an identification for communication with the first sidelink group;
    determine a feedback resource configuration corresponding to common feedback resources associated with the first sidelink group based at least in part on the group size of the first sidelink group exceeding a threshold; and
    communicate with the first sidelink group based at least in part on the identification for communication.

23. An apparatus for wireless communication at a first user equipment (UE), comprising:
  at least one processor; and
  at least one memory coupled to the at least one processor, the at least one processor configured to cause the first UE to:
    configure a first sidelink group for sidelink groupcast communication, wherein the first sidelink group includes at least the first UE and a second UE;
    determine a member identification of the first UE;
    determine, based at least in part on the member identification of the first UE, a feedback resource configuration corresponding to common feedback resources associated with the first sidelink group based at least in part on a group size of the first sidelink group exceeding a threshold;
    transmit, to other members of the first sidelink group, sidelink groupcast information that indicates at least the feedback resource configuration;
    determine, at the first UE, an identification for communication with the first sidelink group; and
    communicate with the first sidelink group based at least in part on the identification for communication and the feedback resource configuration.

24. An apparatus for wireless communication at a first user equipment (UE), comprising:
  means for receiving sidelink groupcast information of a first sidelink group, the sidelink groupcast information including a group size of the first sidelink group, and a member identification of the first UE within the first sidelink group, wherein the first sidelink group includes at least the first UE and a second UE;
  means for determining, at the first UE, an identification for communication with the first sidelink group;
  means for determining a feedback resource configuration corresponding to common feedback resources associated with the first sidelink group based at least in part on the group size of the first sidelink group exceeding a threshold; and
  means for communicating with the first sidelink group based at least in part on the identification for communication.

25. The apparatus of claim 24, wherein the member identification of the first UE is included as a subset of bits of a source layer 2 identification.

26. The apparatus of claim 24, further comprising:
  means for determining, based at least in part on the group size of the first sidelink group and the member identification of the first UE within the first sidelink group, a set of feedback resources for transmitting feedback to one or more members of the first sidelink group.

27. The apparatus of claim 26, further comprising:
  means for receiving a first groupcast communication from the second UE;
  means for determining feedback for the first groupcast communication; and
  means for transmitting the feedback for the first groupcast communication to the second UE using the set of feedback resources.

28. The apparatus of claim 24, wherein the sidelink groupcast information is received at an application layer of the first UE.

29. An apparatus for wireless communication at a first user equipment (UE), comprising:
  means for configuring a first sidelink group for sidelink groupcast communication, wherein the first sidelink group includes at least the first UE and a second UE;
  means for determining a member identification of the first UE;
  means for determining, based at least in part on the member identification of the first UE, a feedback resource configuration corresponding to common feedback resources associated with the first sidelink group based at least in part on a group size of the first sidelink group exceeding a threshold;
  means for transmitting, to other members of the first sidelink group, sidelink groupcast information that indicates at least the feedback resource configuration;
  means for determining, at the first UE, an identification for communication with the first sidelink group; and
  means for communicating with the first sidelink group based at least in part on the identification for communication and the feedback resource configuration.

30. A non-transitory computer-readable medium storing code for wireless communication at a first user equipment (UE), the code comprising instructions executable by at least one processor to:
  receive sidelink groupcast information of a first sidelink group, the sidelink groupcast information including a group size of the first sidelink group, and a member identification of the first UE within the first sidelink group, wherein the first sidelink group includes at least the first UE and a second UE;
  determine, at the first UE, an identification for communication with the first sidelink group;
  determine a feedback resource configuration corresponding to common feedback resources associated with the first sidelink group based at least in part on the group size of the first sidelink group exceeding a threshold; and communicate with the first sidelink group based at least in part on the identification for communication.

31. The non-transitory computer-readable medium of claim 30, wherein the member identification of the first UE is included as a subset of bits of a source layer 2 identification.

32. The non-transitory computer-readable medium of claim 30, wherein the instructions are further executable by the at least one processor to:
determine, based at least in part on the group size of the first sidelink group and the member identification of the first UE within the first sidelink group, a set of feedback resources for transmitting feedback to one or more members of the first sidelink group.

33. The non-transitory computer-readable medium of claim 32, wherein the instructions are further executable by the at least one processor to:
receive a first groupcast communication from the second UE;
determine feedback for the first groupcast communication; and
transmit the feedback for the first groupcast communication to the second UE using the set of feedback resources.

34. The non-transitory computer-readable medium of claim 30, wherein the sidelink groupcast information is received at an application layer of the first UE.

35. A non-transitory computer-readable medium storing code for wireless communication at a first user equipment (UE), the code comprising instructions executable by at least one processor to:
configure a first sidelink group for sidelink groupcast communication, wherein the first sidelink group include at least the first UE and a second UE;
determine a member identification of the first UE;
determine, based at least in part on the member identification of the first UE, a feedback resource configuration corresponding to common feedback resources associated with the first sidelink group based at least in part on a group size of the first sidelink group exceeding a threshold;
transmit, to other members of the first sidelink group, sidelink groupcast information that indicates at least the feedback resource configuration;
determine, at the first UE, an identification for communication with the first sidelink group; and
communicate with the first sidelink group based at least in part on the identification for communication and the feedback resource configuration.

36. The apparatus of claim 22, wherein the member identification of the first UE is included as a subset of bits of a source layer 2 identification.

37. The apparatus of claim 22, wherein the at least one processor is further configured to:
determine, based at least in part on the group size of the first sidelink group and the member identification of the first UE within the first sidelink group, a set of feedback resources for transmitting feedback to one or more members of the first sidelink group.

38. The apparatus of claim 37, wherein the at least one processor is further configured to:
receive a first groupcast communication from the second UE;
determine feedback for the first groupcast communication; and
transmit the feedback for the first groupcast communication to the second UE using the set of feedback resources.

39. The apparatus of claim 22, wherein the sidelink groupcast information is received at an application layer of the first UE.

40. The apparatus of claim 22, wherein the at least one processor is further configured to:
configure an access stratum layer at the first UE for a quality of service (QoS) flow for a groupcast communications associated with a layer-2 identification.

41. The apparatus of claim 24, further comprising:
means for configuring an access stratum layer at the first UE for a quality of service (QoS) flow for a groupcast communications associated with a layer-2 identification.

42. The non-transitory computer-readable medium of claim 30, wherein the instructions are further executable by the at least one processor to:
configure an access stratum layer at the first UE for a quality of service (QoS) flow for a groupcast communication associated with a layer-2 identification.

43. The apparatus of claim 22, further comprising:
an antenna array, the at least one processor configured to cause the antenna array to:
communicate with the first sidelink group.

44. The apparatus of claim 23, further comprising:
an antenna array, the at least one processor configured to cause the antenna array to:
communicate with the first sidelink group.

45. The apparatus of claim 22, wherein the sidelink groupcast information further includes a group identifier of the first sidelink group, and wherein the identification for communication is a destination layer-2 identification based at least in part on the group identifier.

46. The apparatus of claim 24, wherein the sidelink groupcast information further includes a group identifier of the first sidelink group, and wherein the identification for communication is a destination layer-2 identification based at least in part on the group identifier.

47. The non-transitory computer-readable medium of claim 30, wherein the sidelink groupcast information further includes a group identifier of the first sidelink group, and wherein the identification for communication is a destination layer-2 identification based at least in part on the group identifier.

48. The method of claim 16, wherein the sidelink groupcast information further includes a group identifier of the first sidelink group, and wherein the identification for communication is a destination layer-2 identification based at least in part on the group identifier.

49. The apparatus of claim 23, wherein the sidelink groupcast information further includes a group identifier of the first sidelink group, and wherein the identification for communication is a destination layer-2 identification based at least in part on the group identifier.

50. The apparatus of claim 29, wherein the sidelink groupcast information further includes a group identifier of the first sidelink group, and wherein the identification for communication is a destination layer-2 identification based at least in part on the group identifier.

51. The non-transitory computer-readable medium of claim 35, wherein the sidelink groupcast information further includes a group identifier of the first sidelink group, and wherein the identification for communication is a destination layer-2 identification based at least in part on the group identifier.

52. The method of claim 1, wherein the feedback resource configuration indicates the common feedback resources for transmission of negative acknowledgment feedback.

53. The method of claim 1, wherein the sidelink groupcast information is received at a group management mid-ware layer at the first UE.

54. The apparatus of claim 22, wherein the feedback resource configuration indicates the common feedback resources for transmission of negative acknowledgment feedback.

55. The apparatus of claim 22, wherein the sidelink groupcast information is received at a group management mid-ware layer at the first UE.

56. The apparatus of claim 24, wherein the sidelink groupcast information is received at a group management mid-ware layer at the first UE.

57. The non-transitory computer-readable medium of claim 30, wherein the sidelink groupcast information is received at a group management mid-ware layer at the first UE.

58. The apparatus of claim 24, wherein the feedback resource configuration indicates the common feedback resources for transmission of negative acknowledgment feedback.

59. The non-transitory computer-readable medium of claim 30, wherein the feedback resource configuration indicates the common feedback resources for transmission of negative acknowledgment feedback.

* * * * *